(12) United States Patent
Kondrad et al.

(10) Patent No.: US 10,525,930 B2
(45) Date of Patent: Jan. 7, 2020

(54) SHOULDER BELT GUIDE FOR A VEHICLE SEATING ASSEMBLY

(71) Applicant: Ford Global Technologies, LLC, Dearborn, MI (US)

(72) Inventors: Marcos Silva Kondrad, Macomb Township, MI (US); Ryan Welch, Ottawa Lake, MI (US); Kevin Mozurkewich, Livonia, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 15/870,167

(22) Filed: Jan. 12, 2018

(65) Prior Publication Data
US 2019/0217813 A1    Jul. 18, 2019

(51) Int. Cl.
| B60R 22/26 | (2006.01) |
| B60N 2/64 | (2006.01) |
| B60N 2/80 | (2018.01) |
| B60R 22/12 | (2006.01) |
| B60R 22/18 | (2006.01) |

(52) U.S. Cl.
CPC ............... B60R 22/26 (2013.01); B60N 2/64 (2013.01); B60N 2/80 (2018.02); B60R 22/12 (2013.01); *B60R 2022/1818* (2013.01)

(58) Field of Classification Search
CPC .. B60R 22/12; B60R 22/26; B60R 2022/1818
See application file for complete search history.

(56) References Cited

U.S. PATENT DOCUMENTS

| 4,482,187 A | * | 11/1984 | Nagashima | ........... B60R 22/023 297/468 |
| 5,263,741 A | * | 11/1993 | Seros | .................... B60R 22/024 280/808 |
| 5,979,991 A | * | 11/1999 | Lewandowski | ......... B60R 22/26 297/391 |
| 6,079,780 A | * | 6/2000 | Bapst | ................... B60N 2/2806 116/200 |
| 6,726,287 B1 | * | 4/2004 | Janz | ....................... B60N 2/688 297/216.13 |
| 6,811,186 B1 | | 11/2004 | Fraley et al. | |
| 7,273,232 B2 | | 9/2007 | Fontecchio et al. | |

(Continued)

*Primary Examiner* — James A English
(74) *Attorney, Agent, or Firm* — Vichit Chea; Price Heneveld LLP

(57) ABSTRACT

A seatback for a seating assembly of a vehicle comprising: a top portion; a headrest extending above the top portion; and a first shoulder belt guide disposed adjacent the top portion, fastened to the seatback, and configured to accept and retain a first shoulder belt of an occupant restraint assembly. The seatback further comprises a boss receiver and the first shoulder belt guide includes a first boss. The first boss is disposed within the boss receiver. A fastener can be disposed through the boss receiver and into the boss of the first shoulder belt guide disposed in the boss receiver to fasten the first shoulder belt guide to the seatback. The first shoulder belt guide is disposed adjacent the top portion to a first side of a midline of the seatback. A second shoulder belt guide can be disposed adjacent the top portion to a second side of the midline.

20 Claims, 19 Drawing Sheets

(56) References Cited

U.S. PATENT DOCUMENTS

| | | | | |
|---|---|---|---|---|
| 7,510,242 B2* | 3/2009 | Yumoto | ............... | B60N 2/2806 |
| | | | | 297/250.1 |
| 10,179,529 B1* | 1/2019 | Kondrad | ............... | B60R 22/023 |
| 2011/0068615 A1* | 3/2011 | Rossmann | ............... | B60R 22/26 |
| | | | | 297/483 |
| 2011/0316321 A1* | 12/2011 | Kujawa | ................ | B60N 2/688 |
| | | | | 297/468 |
| 2017/0210262 A1* | 7/2017 | Line | .................... | B60N 2/7094 |

* cited by examiner

SHOULDER BELT GUIDE FOR A VEHICLE SEATING ASSEMBLY

FIELD OF THE INVENTION

The present invention generally relates to a shoulder belt guide for a seating assembly of a vehicle that guides the shoulder belt of an occupant restraint assembly, which secures an occupant to the seating assembly.

BACKGROUND OF THE INVENTION

High performance vehicles often include an occupant restraint assembly to secure an occupant to a seating assembly within the vehicle. The occupant restraint assembly typically includes a pair of shoulder belts intended to be situated over each of the shoulders of the occupant.

SUMMARY OF THE INVENTION

According to one aspect of the present invention, a seatback for a seating assembly of a vehicle comprises: a top portion; a headrest extending above the top portion; and a first shoulder belt guide disposed adjacent the top portion, fastened to the seatback, and configured to accept and retain a first shoulder belt of an occupant restraint assembly.

Embodiments of the first aspect of the invention can include any one or a combination of the following features:
the seatback further comprising a boss receiver;
the first shoulder belt guide including a first boss;
the first boss is disposed within the boss receiver;
a fastener disposed through the boss receiver and into the boss of the first shoulder belt guide disposed in the boss receiver to fasten the first shoulder belt guide to the seatback;
the first shoulder belt guide is disposed adjacent the top portion to a first side of a midline of the seatback;
a second shoulder belt guide disposed adjacent the top portion to a second side of the midline, fastened to the seatback, and configured to accept and retain a second shoulder belt of the occupant restraint assembly;
at least one boss receiver disposed on both the first side of the midline and the second side of the midline;
the first shoulder belt guide including at least one boss and the second shoulder belt guide including at least one boss;
the at least one boss of the first shoulder belt guide is disposed within the at least one boss receiver disposed at the first side of the midline;
the at least one boss of the second shoulder belt guide is disposed within the at least one boss receiver disposed at the second side of the midline;
a fastener disposed through each of the at least one boss receiver and into each boss of the first shoulder belt guide disposed in the at least one boss receiver to fasten the first shoulder belt guide to the seatback;
a fastener disposed through each of the at least one boss receiver and into each boss of the second shoulder belt guide disposed in the at least one boss receiver to fasten the second shoulder belt guide to the seatback;
a headrest support assembly extending the headrest above the top portion of the seatback;
the first shoulder belt guide and the second shoulder belt guide are fastened to the headrest support assembly;
the first shoulder belt guide including a lateral section, an inner section upwardly extending from the lateral section, and an outer section upwardly extending from the lateral section, the inner section being disposed closer to the midline than the outer section;
the second shoulder belt guide including a lateral section, an inner section upwardly extending from the lateral section, and an outer section upwardly extending from the lateral section, the inner section being disposed closer to the midline than the outer section;
the lateral section, the inner section, and the outer section of the first shoulder belt guide form a channel configured to retain the first shoulder belt with the first shoulder belt disposed above and in contact with the lateral section, and disposed between the inner section and the outer section;
the lateral section, the inner section, and the outer section of the second shoulder belt guide form a channel configured to retain the second shoulder belt with the second shoulder belt disposed above and in contact with the lateral section, and disposed between the inner section and the outer section;
the lateral section of the first shoulder belt guide includes a seatback contact surface and the at least one boss of the first shoulder belt guide includes a first boss and a second boss that extends generally outward from the seatback contact surface;
the lateral section of the second shoulder belt guide includes a seatback contact surface and the at least one boss of the second shoulder belt guide includes a first boss and a second boss that extends generally outward from the seatback contact surface;
a first shim disposed over the lateral section of the first shoulder belt guide, the first shim including an elevated lateral belt contact surface disposed above the lateral belt contact surface of the lateral section; and
the elevated lateral belt contact surface of the first shim, and the inner section and the outer section of the first shoulder belt guide, form the channel configured to retain the first shoulder belt with the first shoulder belt disposed above and in contact with the elevated lateral belt contact surface of the first shim, and disposed between the inner section and the outer section of the first shoulder belt guide.

According to a second aspect of the present invention, a shoulder belt guide to retain a shoulder belt of an occupant restraint assembly above a top portion of a seatback comprises: a lateral belt contact surface configured to contact a shoulder belt of an occupant restraint assembly; an inner section upwardly extending from the lateral belt contact surface; an outer section upwardly extending from the lateral belt contact surface opposite of the inner section; the lateral belt contact surface, the inner section, and the outer section forming a channel configured to retain the shoulder belt; and a first boss and a second boss configured to assist in fastening the shoulder belt guide to the seatback at a predetermined location on the seatback.

Embodiments of the second aspect of the invention can include any one or a combination of the following features:
a first fastener receiver configured to receive a fastener to fasten the shoulder belt guide to the seatback;
a second fastener receiver configured to receive a fastener to fasten the shoulder belt guide to a seatback;
the first boss includes the first fastener receiver;
the second boss includes the second fastener receiver;
a seatback contact surface configured to contact the seatback when the shoulder belt guide is fastened to the seatback;
the first boss and the second boss are disposed at the seatback contact surface such that the first boss and the second boss are configured to be received by a first boss receiver and a second boss receiver of the seatback and to be hidden from view during normal use of the seatback;
a lateral section that includes the lateral belt contact surface and the seatback contact surface;
the seatback contact surface and the lateral belt contact surface are disposed on opposite sides of the lateral section;
a top section extending generally laterally from the inner section and the outer section;
the top section, the lateral section, the inner section, and the outer section combine to bound contiguously the channel;
the outer section extends from the lateral section at an acute angle;
a first bushing countersunk into the first boss, the first bushing configured to receive a fastener to fasten the shoulder belt guide to the seatback; and
a second bushing countersunk into the second boss, the second bushing configured to receive a fastener to fasten the shoulder belt guide to the seatback.

According to a third aspect of the present invention, a seatback comprises: a first boss receiver; and a first shoulder belt guide including a first boss and a lateral belt contact surface, the first shoulder belt guide configured to accept and retain a first shoulder belt of an occupant restraint assembly above the lateral belt contact surface; wherein, in a first position of the shoulder belt guide, the first boss is disposed within the first boss receiver and a fastener is disposed through the first boss receiver and into the first boss to fasten the first shoulder belt guide to the seatback; wherein, in a second position of the shoulder belt guide, an extender including a first end, a second end, and a central aperture is disposed between the first shoulder belt guide and the first boss receiver, with the first end of the extender surrounding and receiving the first boss of the first shoulder belt guide, the first boss receiver receiving the second end of the extender, and a fastener is disposed through the first boss receiver, through central aperture of the extender, and into the first boss to fasten the first shoulder belt guide to the seatback; and wherein, in the second position, the lateral belt contact surface is at a higher elevation than in the first position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
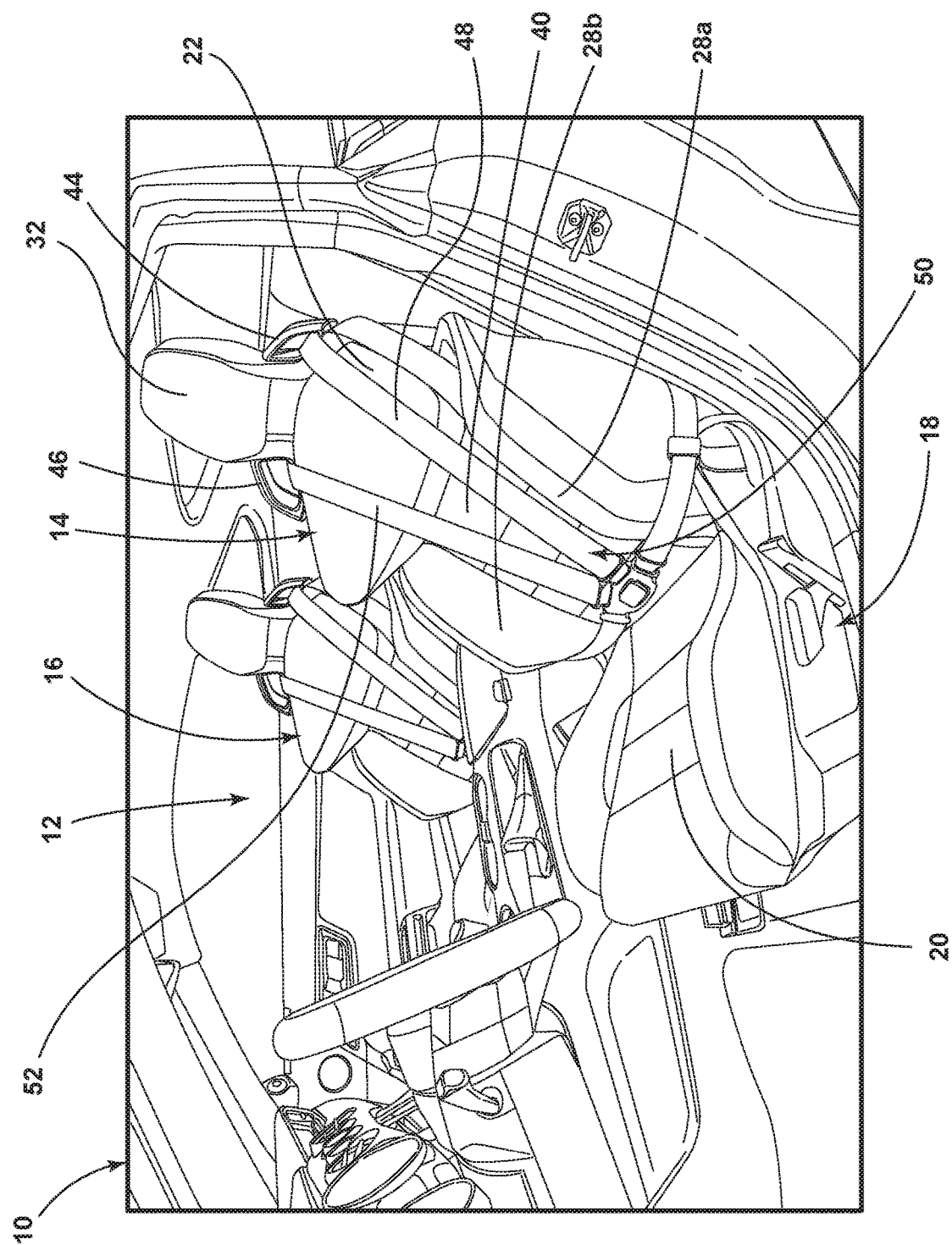
FIG. 1 is a perspective view of a vehicle, illustrating an interior and a first seating assembly, disposed in the interior, including a seatback and an occupant restraint assembly with a first shoulder belt and a second shoulder belt to secure an occupant to the first seating assembly.

For purposes of description herein, the terms "above," "outboard," "laterally," "inboard," "upwardly," "outwardly," "elevated," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle 10 includes an interior 12 and a first seating assembly 14 located in the interior 12. The vehicle 10 can further include a second seating assembly 16 disposed next to the first seating assembly 14, forming a first row of seating 18. The first seating assembly 14 can be designated for an occupant (not illustrated) who is operating the vehicle 10. The second seating assembly 16 can be designated for another occupant who is a passenger of the vehicle 10. As the second seating assembly 16 can be identical in all relevant respects for this disclosure to the first seating assembly 14, only the first seating assembly 14 will be further discussed with particularly. The first seating assembly 14 includes a seat 20 and a seatback 22. The vehicle 10 can be any type of automobile, including a high performance car, such as a racecar.

Figure 2:
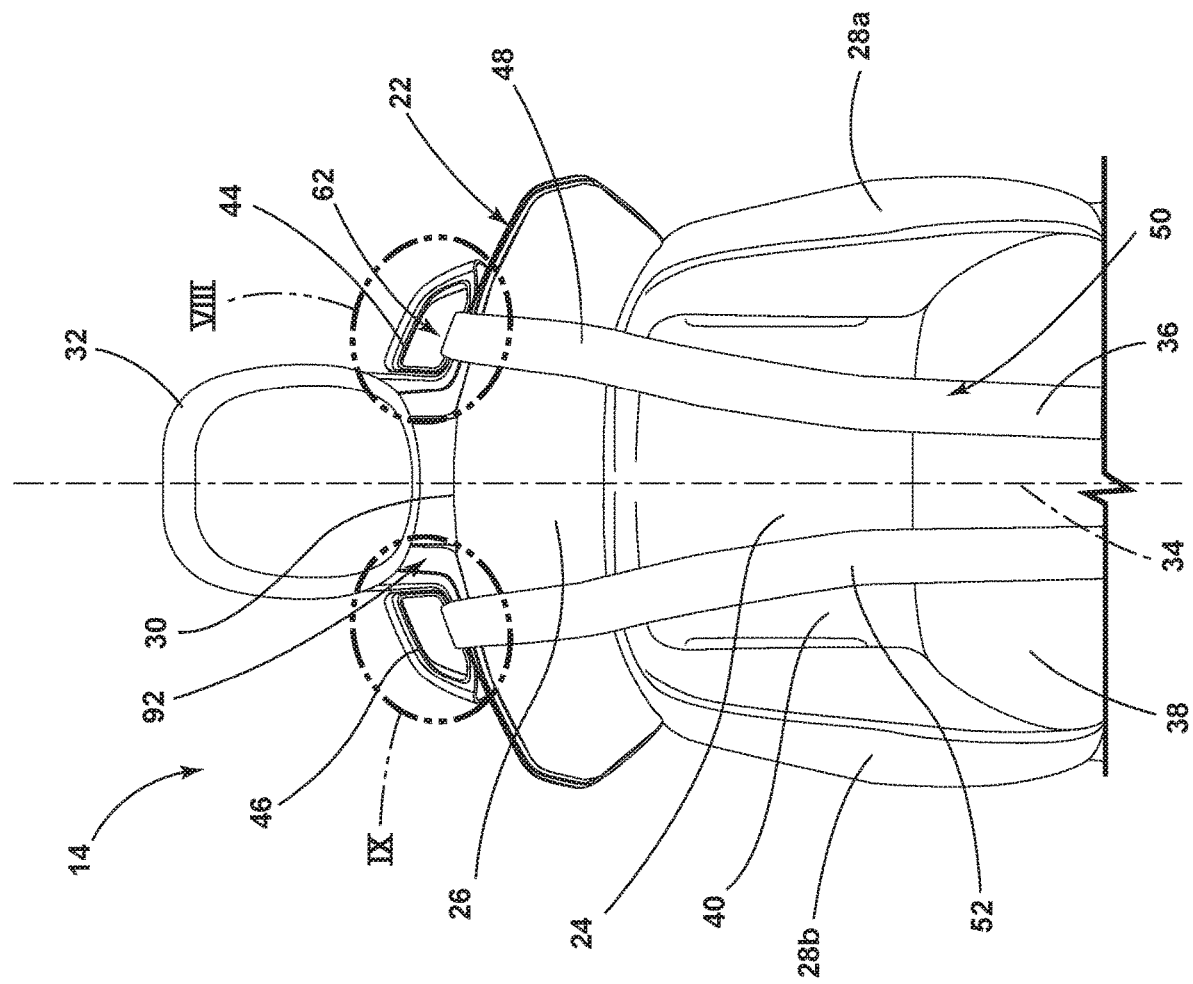
FIG. 2 is a front view of the seatback of the first seating assembly of FIG. 1, illustrating a midline, a first shoulder belt guide disposed at a first side of the midline, and a second shoulder belt guide disposed at a second side of the midline.
Figure 3:
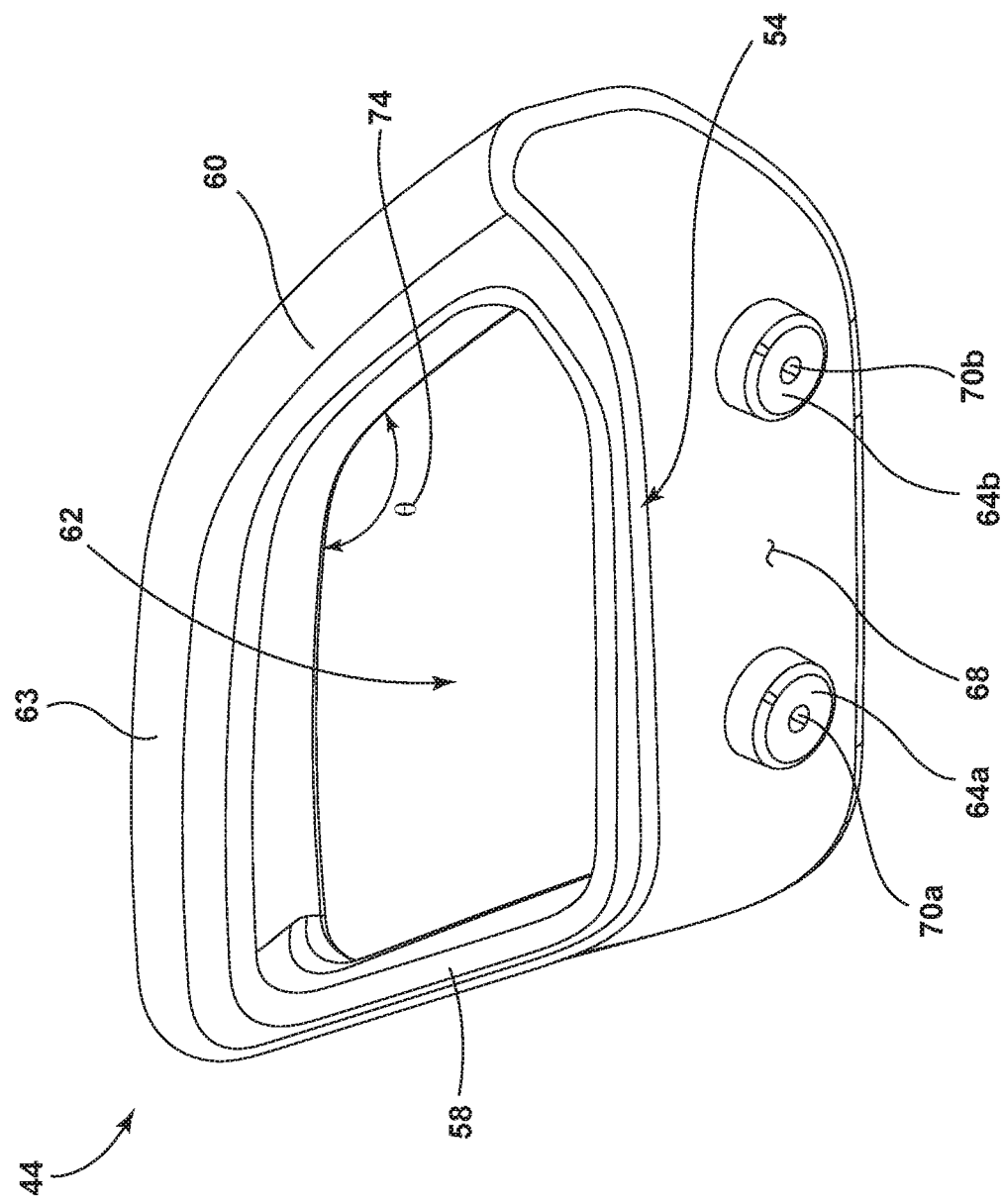
FIG. 3 is a front view of the first shoulder belt guide of FIG. 2, illustrating a lateral section, an inner section, an outer section, and a top section forming a channel to receive and retain the first shoulder belt of FIG. 1.
Figure 4:
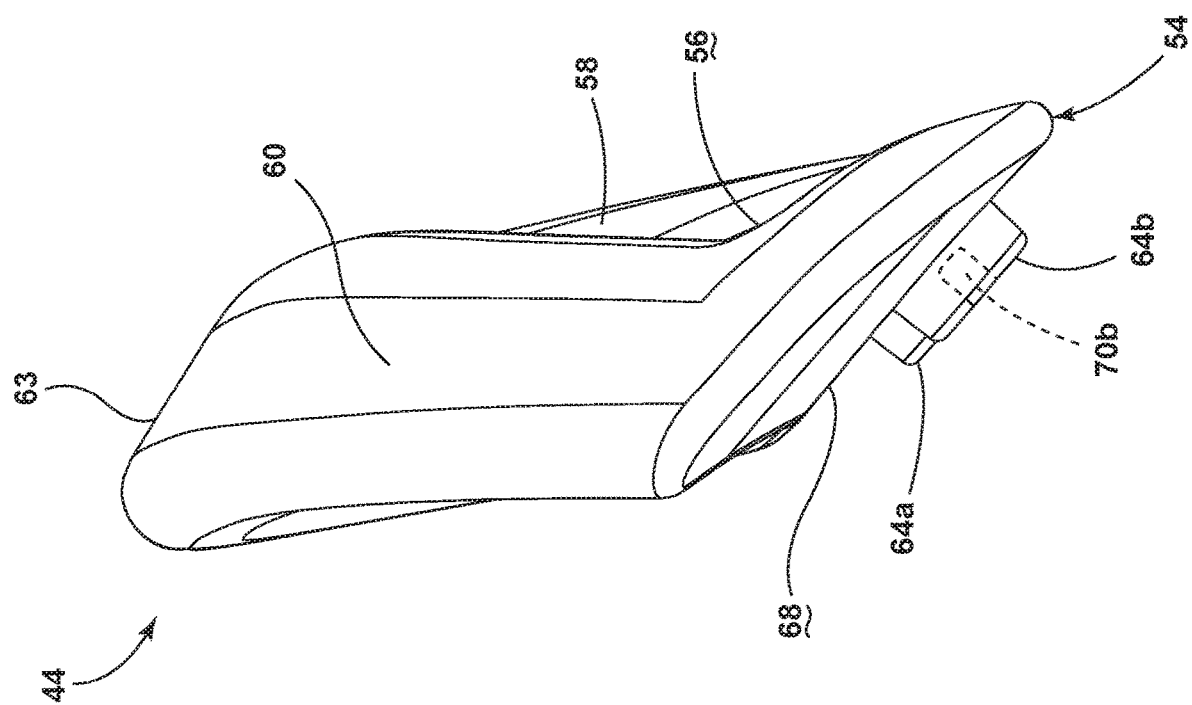
FIG. 4 is a side view of the first shoulder belt guide of FIG. 2, illustrating a lateral belt contact surface disposed on the lateral section and a seatback contact surface on the opposite side of the lateral section as the lateral belt contact surface.
Figure 5:
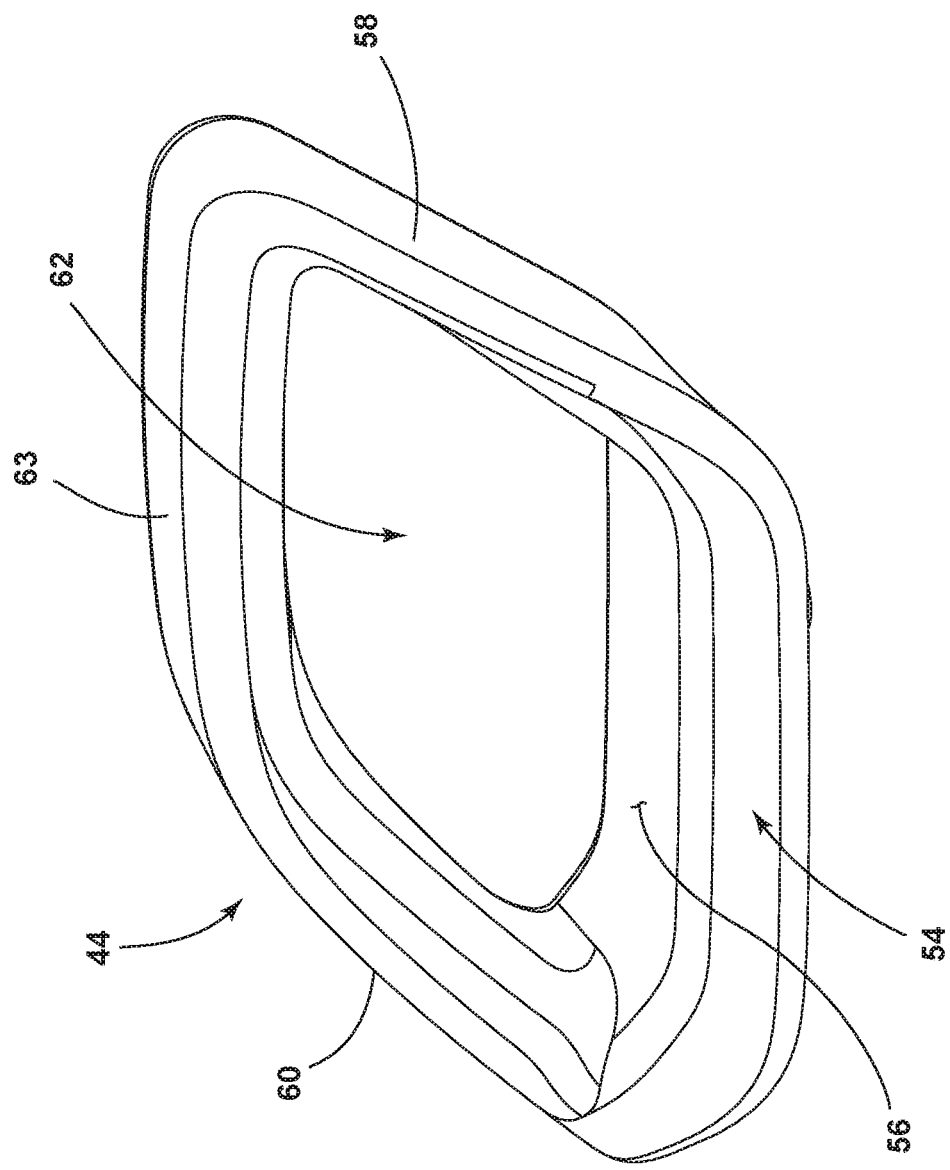
FIG. 5 is a perspective view of the first shoulder belt guide of FIG. 2.
Figure 6:
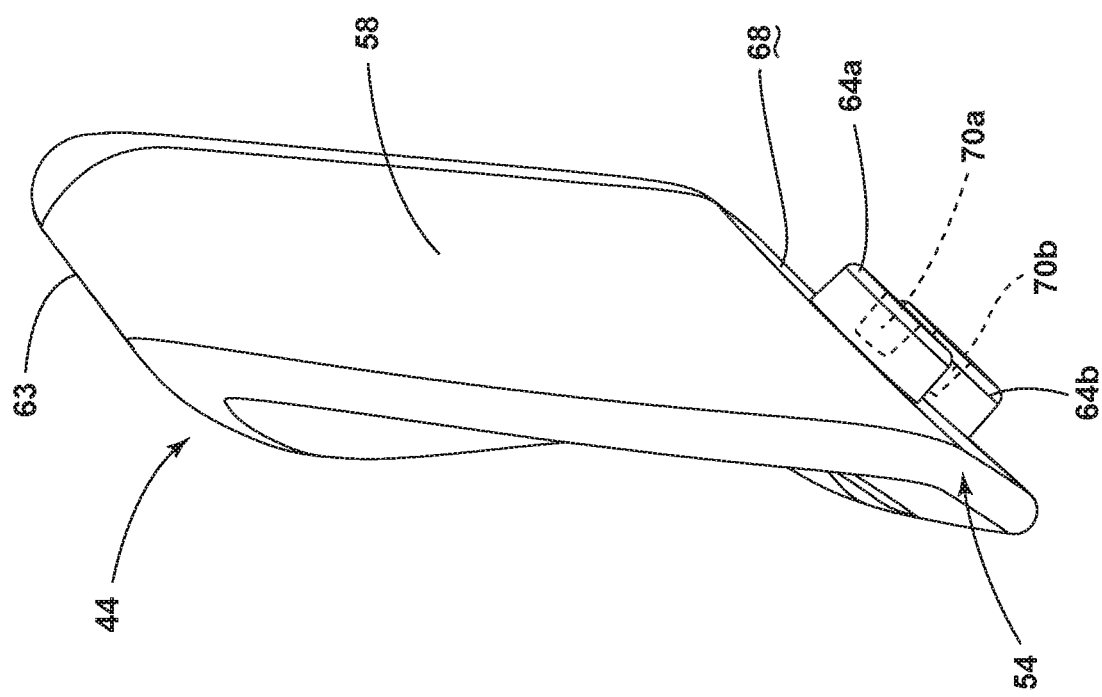
FIG. 6 is a side view of the first shoulder belt guide of FIG. 2, illustrating a first boss and a second boss, which are configured to be received by the seatback, extending outward from the seatback contact surface of the lateral section.
Figure 7:
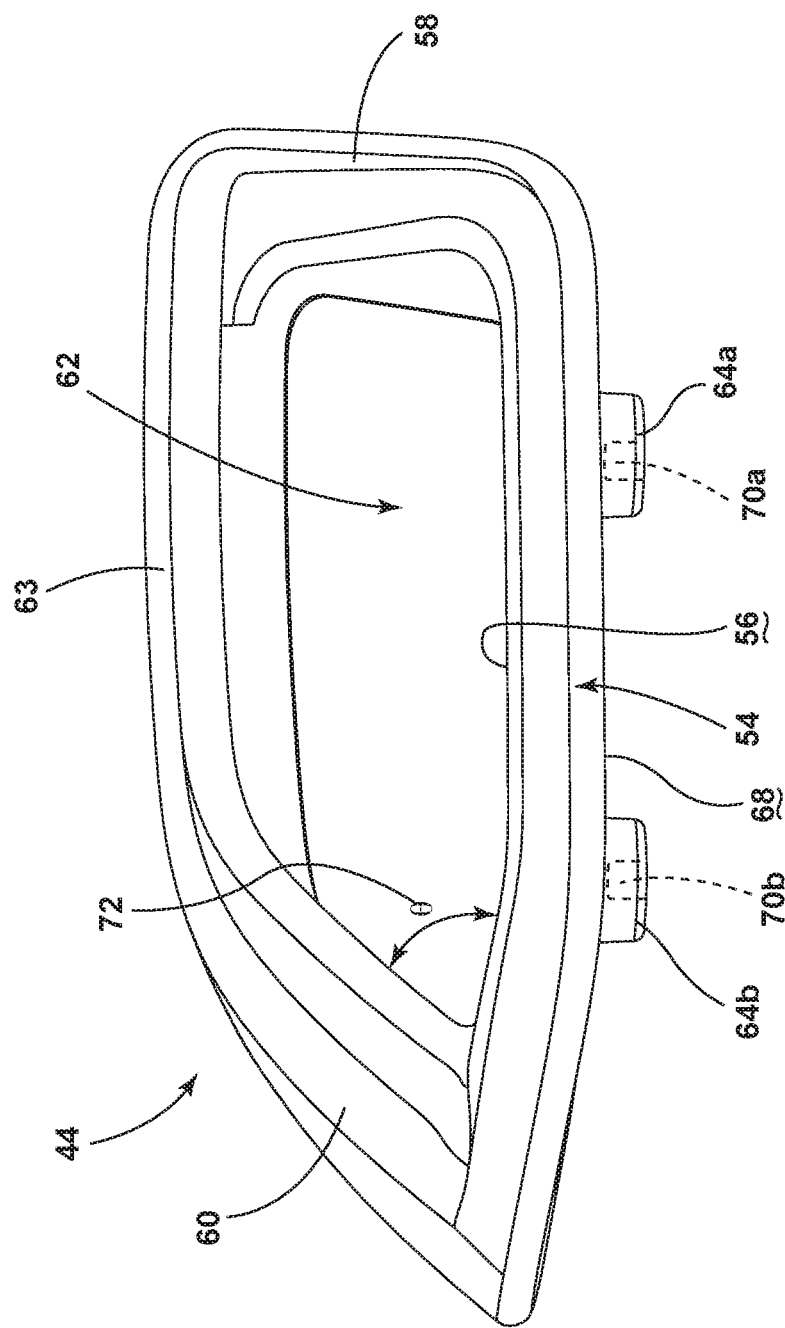
FIG. 7 is a rear view of the first shoulder belt guide of FIG. 2, illustrating the outer section extending from the lateral section at an acute angle, the first boss surrounding a first fastener receiver, and the second boss surrounding a second fastener receiver.
Figure 8:
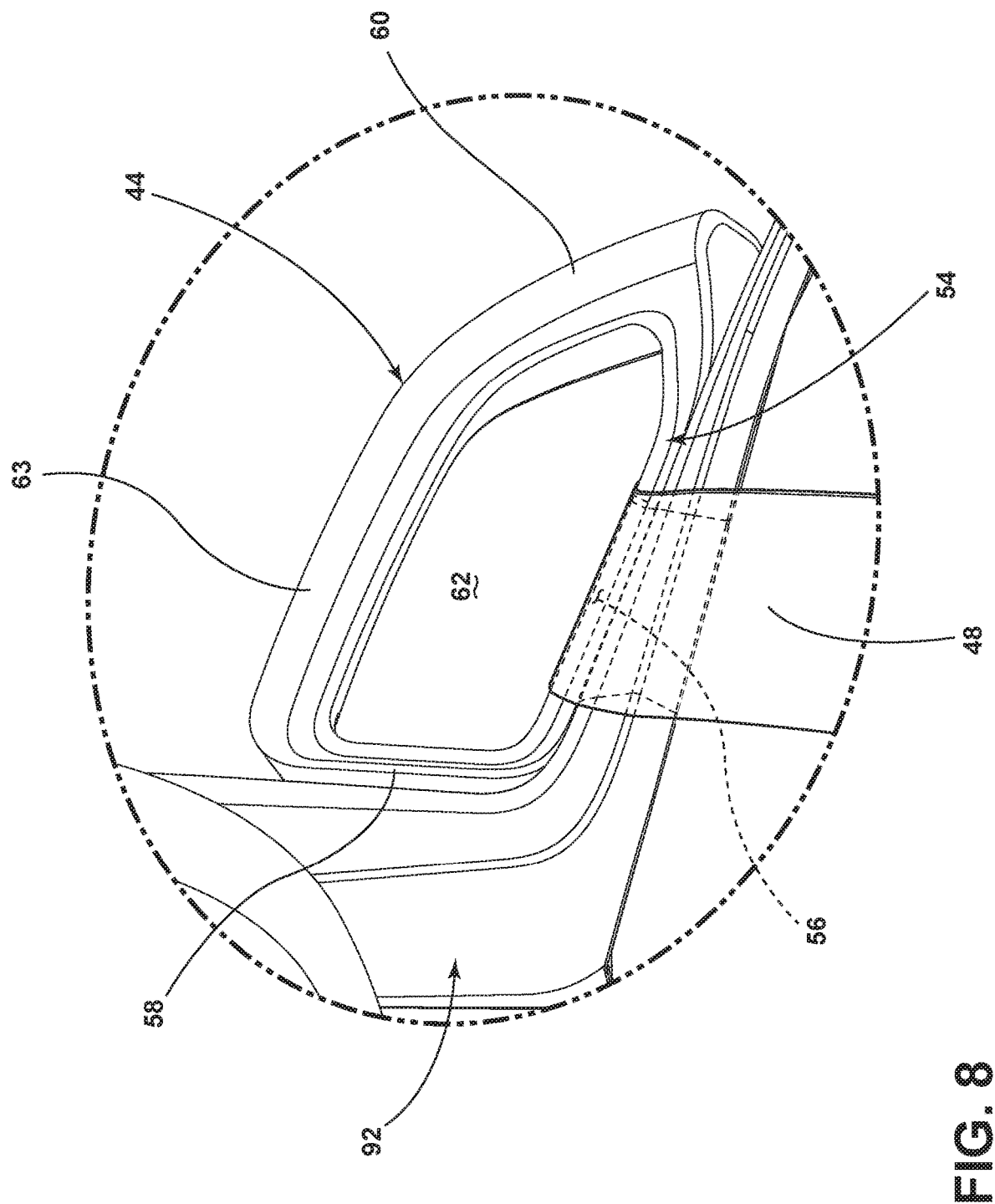
FIG. 8 is an enlarged front view of area VIII of FIG. 2, illustrating the first shoulder belt disposed through the channel of the first shoulder belt guide and contacting the lateral belt contact surface of the lateral section.
Figure 9:
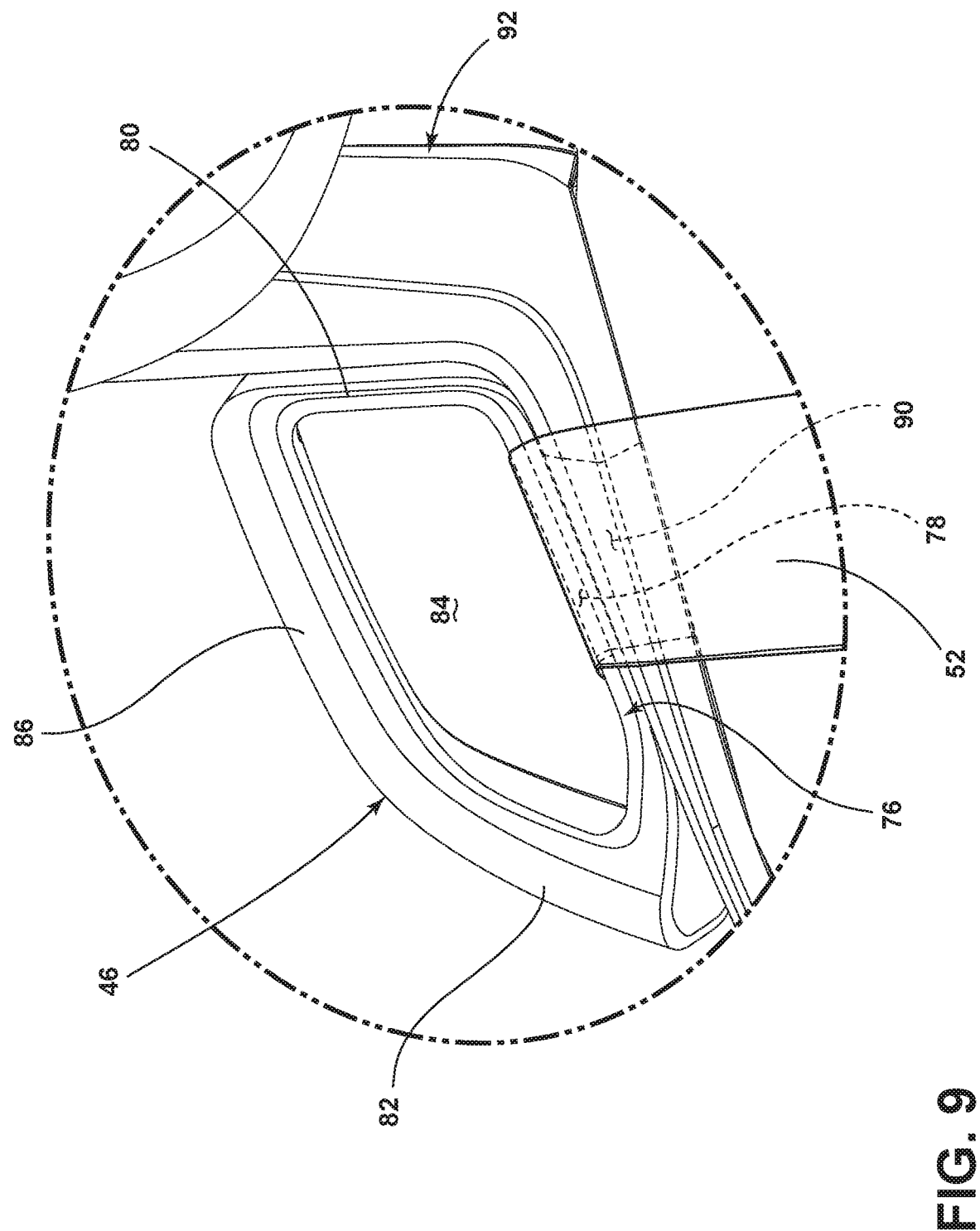
FIG. 9 is an enlarged front view of area IX of FIG. 2, illustrating the second shoulder belt disposed through a channel of the second shoulder belt guide and contacting a lateral belt contact surface of a lateral section of the second shoulder belt guide.
Figure 10:
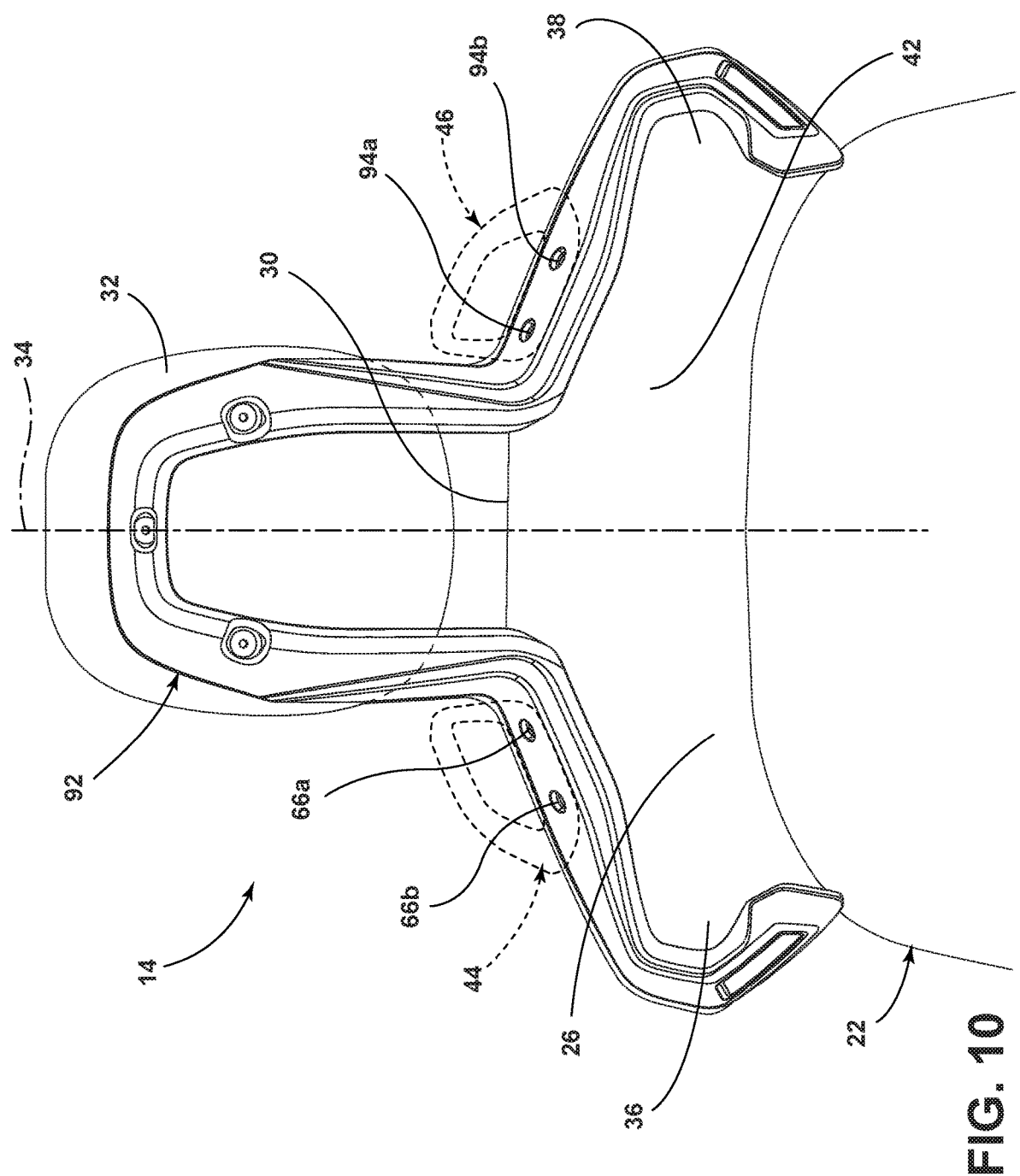
FIG. 10 is a rear view of the seatback of FIG. 2, illustrating a first boss receiver and a second boss receiver disposed at the first side of the midline to receive the first boss and the second boss of the first shoulder belt guide respectively, and a first boss receiver and a second boss receiver disposed at the second side of the midline to receive the first boss and the second boss of the second shoulder belt guide respectively.
Figure 11:
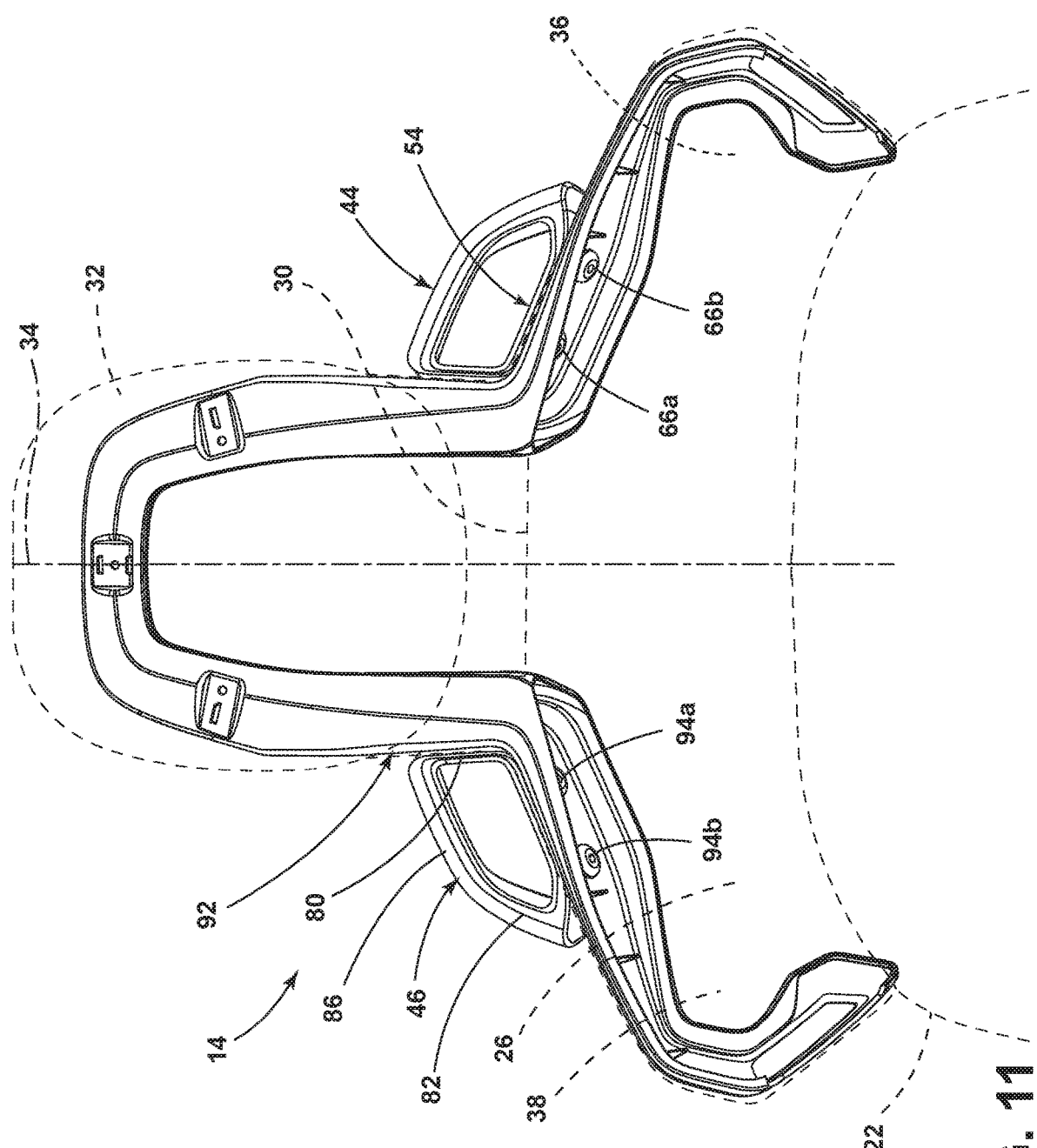
FIG. 11 is a front view of a headrest support assembly attached to the seatback of FIG. 2, illustrating the first shoulder belt guide and the second shoulder belt guide fastened to the headrest support assembly.
Figure 12:
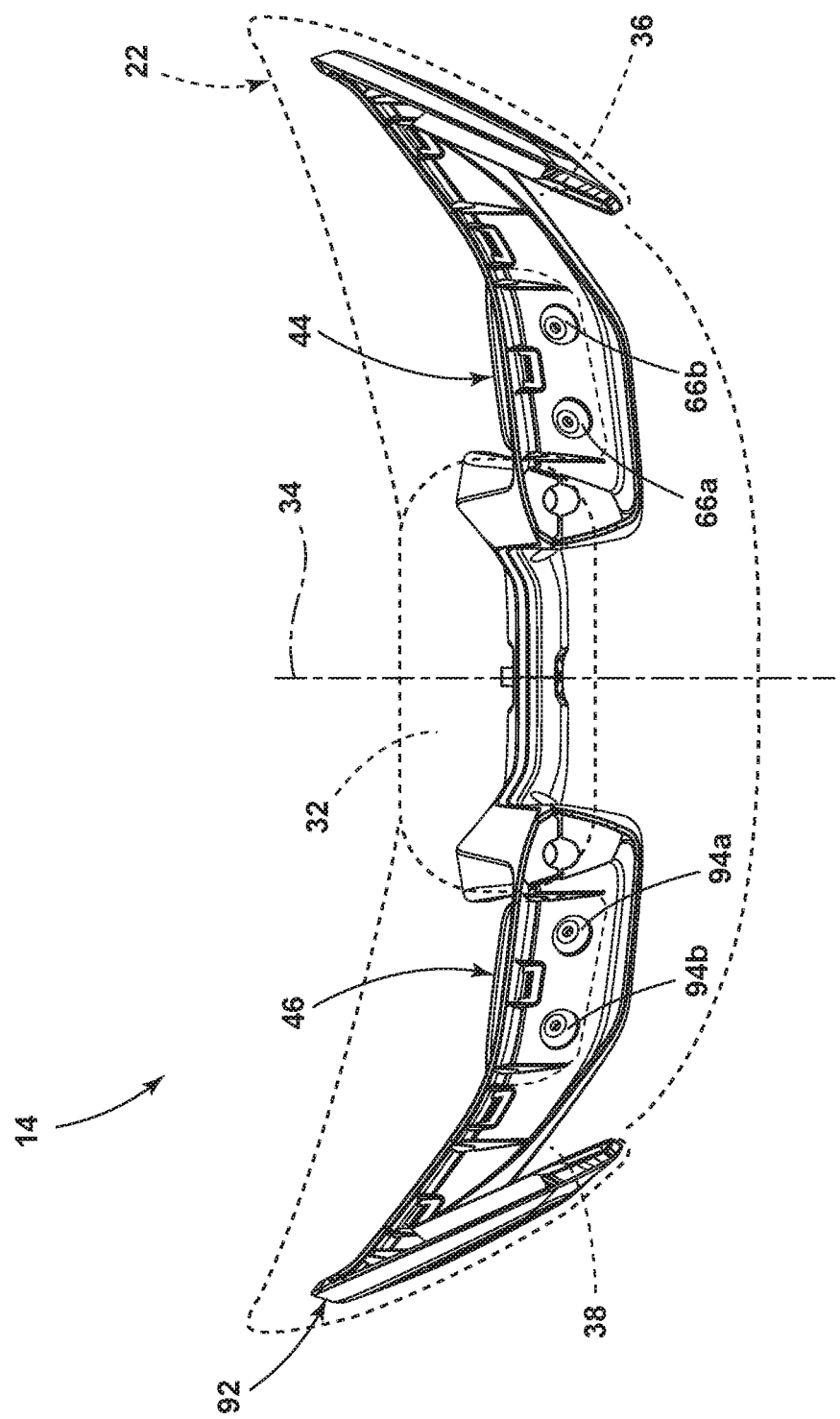
FIG. 12 is a bottom view of the headrest support assembly of FIG. 11, illustrating the first boss receiver and the second boss receiver disposed to the first side of the midline and the first boss receiver and the second boss receiver disposed to the second side of the midline.
Figure 13:
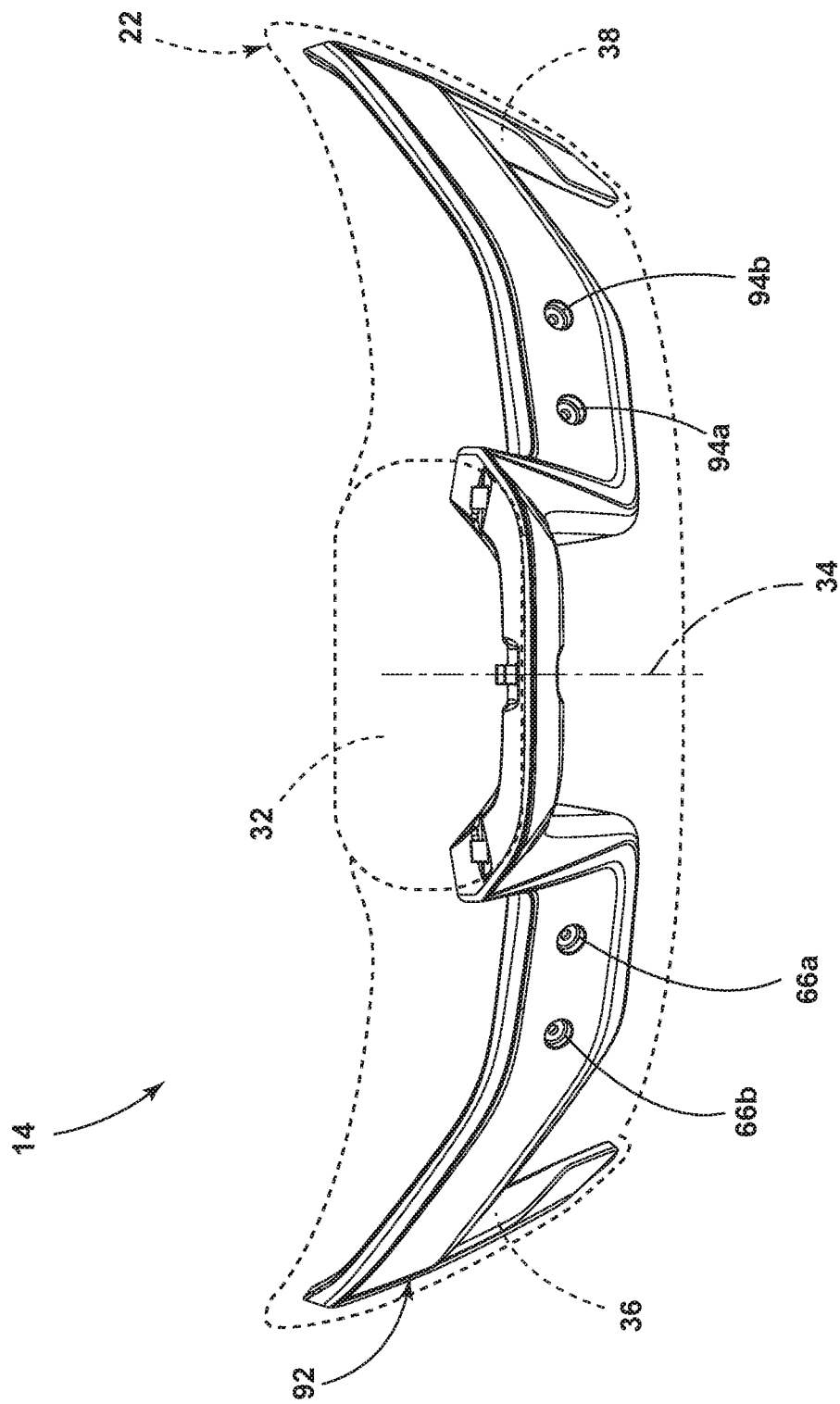
FIG. 13 is a top view of the headrest support assembly of FIG. 11.

Referring now particularly to FIG. 2, the seatback 22 is contoured generally to support the back of the occupant. The seatback 22 can include a lower section 24 and an upper section 26 above the lower section 24, which is closer to the seat 20. The lower section 24 typically includes bolsters 28a, 28b, to provide lateral support for the occupant, such as when turning the vehicle 10 at high speeds. The upper section 26 may be contoured to support the upper back and shoulders of the occupant. The seatback 22 includes a top portion 30, which can be disposed at the upper section 26, and a headrest 32 extending above the top portion 30. The seatback 22 can include a midline 34 dividing the seatback 22 into a first side 36 and a second side 38, which are at least approximately symmetrical. The first side 36 of the first seating assembly 14, as illustrated in FIG. 1, is outboard relative to the second side 38, which is inboard relative to the first side 36. The seatback 22 includes a front 40, which contacts and supports the occupant during use, and a rear 42 (see FIG. 10) that generally faces in opposite direction as the front 40.

The seatback 22 further includes a first shoulder belt guide 44 and a second shoulder belt guide 46. The first shoulder belt guide 44 accepts and retains a first shoulder belt 48 of an occupant restraint assembly 50. The second shoulder belt guide 46 accepts and retains a second shoulder belt 52 of the occupant restraint assembly 50. More specifically, the first shoulder belt guide 44 and the second shoulder belt guide 46 retain the first shoulder belt 48 and the second shoulder belt 52, respectively, above the top portion 30 of the seatback 22. The first shoulder belt 48 and the first shoulder belt guide 44 are located outboard laterally from the second shoulder belt 52 and the second shoulder belt guide 46. Stated another way, the first shoulder belt guide 44 is disposed to the first side 36 of the midline 34, while the second shoulder belt guide 46, if present, is disposed to the second side 38 of the midline 34. The occupant restraint assembly 50 can be a racing harness of the 4-point (as illustrated in FIGS. 1 and 2), 5-point, and 6-point varieties, or can be a 3-point seatbelt system typically found in non-racing consumer vehicles. In the event that the occupant restraint assembly 50 is a 3-point seatbelt system, the second shoulder belt 52, which is inboard laterally from the first shoulder belt 48, does not exist and thus the second shoulder belt guide 46, if present, will not be retaining the second shoulder belt 52. The first shoulder belt guide 44 and the second shoulder belt guide 46, if present, can be disposed adjacent the top portion 30 of the seatback 22. As discussed further below, the first shoulder belt guide 44 is fastened to the seatback 22 and, if utilized, the second shoulder belt guide 46 is likewise fastened to the seatback 22. As the second shoulder belt guide 46 can be a mirror image but otherwise identical in all respects to the first shoulder belt guide 44, only the first shoulder belt guide 44 will hereinafter be discussed with particularity.

Referring now to FIGS. 3-9, the first shoulder belt guide 44 includes a lateral section 54 with a lateral belt contact surface 56. The lateral belt contact surface 56 contacts and supports the first shoulder belt 48 of the occupant restraint assembly 50. In other words, the lateral belt contact surface 56 is the surface upon which the first shoulder belt 48 rests, with the first shoulder belt 48 disposed above and in contact with the lateral belt contact surface 56 of the lateral section 54. The first shoulder belt guide 44 further includes an inner section 58 and an outer section 60 both upwardly extending from the lateral belt contact surface 56. The inner section 58 is disposed on the opposite side of the first shoulder belt guide 44 than the outer section 60. When the first shoulder belt guide 44 is attached to the seatback 22, the inner section 58 is disposed closer to the midline 34 of the seatback 22 than the outer section 60.

The lateral section 54 (more specifically, lateral belt contact surface 56 thereof), the inner section 58, and the outer section 60 form a channel 62 that retains the first shoulder belt 48. More specifically, the first shoulder belt 48 rests on the lateral belt contact surface 56 between the inner section 58 and the outer section 60. The inner section 58 prevents the first shoulder belt 48 from moving laterally inboard past the inner section 58 toward the midline 34 of the seatback 22, and the outer section 60 prevents the first shoulder belt 48 from moving laterally outboard past the outer section 60 and off the seatback 22. As in the embodiment illustrated, the first shoulder belt guide 44 can further include a top section 63. The top section 63 generally extends laterally between the inner section 58 and the outer section 60 and cooperates with the lateral section 54 (more specifically, the lateral belt contact surface 56 thereof), the inner section 58, and the outer section 60 to bound contiguously (by closing off from above) the channel 62. In other words, the top section 63 prevents the first shoulder belt 48 from rising above the inner section 58 and outer section 60 and exiting the channel 62.

The first shoulder belt guide 44 further includes at least one boss 64, such as a first boss 64a and a second boss 64b. The first boss 64a and the second boss 64b can perform a poke yoke function and thereby assist in fastening the first shoulder belt guide 44 to the seatback 22 at the proper predetermined location on the seatback 22. As discussed further below, the seatback 22 includes a first boss receiver 66a (see FIG. 10) and a second boss receiver 66b disposed at the first side 36 of the seatback 22 relative to the midline 34 to receive the first boss 64a and the second boss 64b, respectively. The first shoulder belt guide 44 further includes a seatback contact surface 68 that, as discussed further below, contacts the seatback 22 when the first shoulder belt guide 44 is attached to the seatback 22. The first boss 64a and the second boss 64b are disposed at, and extend outward from, the seatback contact surface 68. The seatback contact surface 68 can be located, as in the illustrated embodiment, on the lateral section 54 or elsewhere, such as on the inner section 58. Alternatively, the seatback contact surface 68 can be located on both the lateral section 54 and the inner section 58, with the first boss 64a disposed on one of the lateral section 54 or inner section 58 and the second boss 64b disposed on the other of the lateral section 54 or inner section 58. The seatback contact surface 68 in the illustrated embodiment is disposed on the opposite side of the lateral section 54 as the lateral belt contact surface 56.

The first shoulder belt guide 44 further includes at least one fastener receiver 70, such as first fastener receiver 70a and second fastener receiver 70b. As discussed further below, the first fastener receiver 70a and the second fastener receiver 70b are able to receiver a fastener extending through or from the seatback 22 to fasten the first shoulder belt guide 44 to the seatback 22. The first boss 64a can include the first fastener receiver 70a and the second boss 64b can include the second fastener receiver 70b. For example, the first fastener receiver 70a can be a bushing countersunk (e.g., molded into or heat seated) into the first boss 64a and the second fastener receiver 70b can likewise be a bushing countersunk into the second boss 64b. Alternatively, the first fastener receiver 70a and the second fastener receiver 70b can be thread receivers molded directly into the first boss 64a and the second boss 64b, respectively. As another alternative, the first boss 64a and the second boss 64b can include snap-fit elements that can be received by the seatback 22. The first fastener receiver 70a and the second fastener receiver 70b need not be associated with the first boss 64a and second boss 64b respectively, and can be disposed elsewhere within the first shoulder belt guide 44.

As in the illustrated embodiment, the top section 63 can be approximately parallel to, shifted laterally compared to, and shorter than the lateral section 54. This can result in the outer section 60 extending from the lateral section 54 at an acute angle 72 (see FIG. 7). The outer section 60 and the top section 63 can form an obtuse angle 74 (see FIG. 3).

As mentioned above, the second shoulder belt guide 46 is a mirror image of, but otherwise identical to, the first shoulder belt guide 44 described above. As such, in reference to FIG. 9, the second shoulder belt guide 46 includes a lateral section 76 with a lateral belt contact surface 78 that contacts and supports the second shoulder belt 52. The second shoulder belt guide 46 further includes an inner section 80 and an outer section 82 upwardly extending from the lateral section 76 and forming a channel 84, bounded above by a top section 86, that retains the second shoulder belt 52. In other words, the lateral section 76, the inner section, 80, and the outer section 82 form the channel 84 to retain the second shoulder belt 52, with the second shoulder belt 52 above and in contact with the lateral belt contact surface 78 of the lateral section 76 between the inner section 80 and the outer section 82. The second shoulder belt guide 46 further includes at least one boss 88, such as a first boss 88a and a second boss 88b (see FIG. 14), extending outward from a seatback contact surface 90. A first fastener receiver 100a is disposed within the first boss 88a and a second fastener receiver 100b is disposed within the second boss 88b. Note that element names of the second shoulder belt guide 46 that match elements names of the first shoulder belt guide 44 accordingly include, by reference, any discussion above related to such element of the first shoulder belt guide 44. For example, the inner section 80 of the second shoulder belt guide 46 is disclosed closer to the midline 34 of the seatback 22 than the outer section 82, just as with the first should belt guide 44.

Referring now to FIGS. 10-13, the seatback 22 further can further include a headrest support assembly 92. The headrest support assembly 92 extends the headrest 32 above the top portion 30 of the seatback 22. The headrest support assembly 92 can be attached to the rear 42 of the seatback 22. If the seatback 22 is divided into the upper section 26 and the lower section 24, the headrest support assembly 92 can be attached to the upper section 26.

As mentioned above, the seatback 22 includes at least one boss receiver 66, such as the first boss receiver 66a, to receive one of the bosses 64, such as the first boss 64a, of the first shoulder belt guide 44. The seatback 22 can include at least one boss receiver 66, 94 disposed on both the first side 36 of the midline 34 and the second side 38 of the midline 34, to receive one of the bosses 64, 88 of the first shoulder belt guide 44 and the second shoulder belt guide 46, respectively. For example, in the illustrated embodiment, the seatback 22 includes a first boss receiver 66a and a second boss receiver 66b disposed to the first side 36 of the midline 34 to receive the first boss 64a and the second boss 64b, respectively, of the first shoulder belt guide 44. The seatback 22 of the illustrated embodiment further includes a first boss receiver 94a and a second boss receiver 94b disposed to the second side 38 of the midline 34 to receive the first boss 88a and the second boss 88b, respectively, of the second shoulder belt guide 46. The first boss receiver 66a and the second boss receiver 66b at the first side 36 of the midline 34, and the first boss receiver 94a and the second boss receiver 94b at the second side 38 of the midline 34, can all be disposed on the headrest support assembly 92, if the headrest support assembly 92 is utilized.

Figure 14:
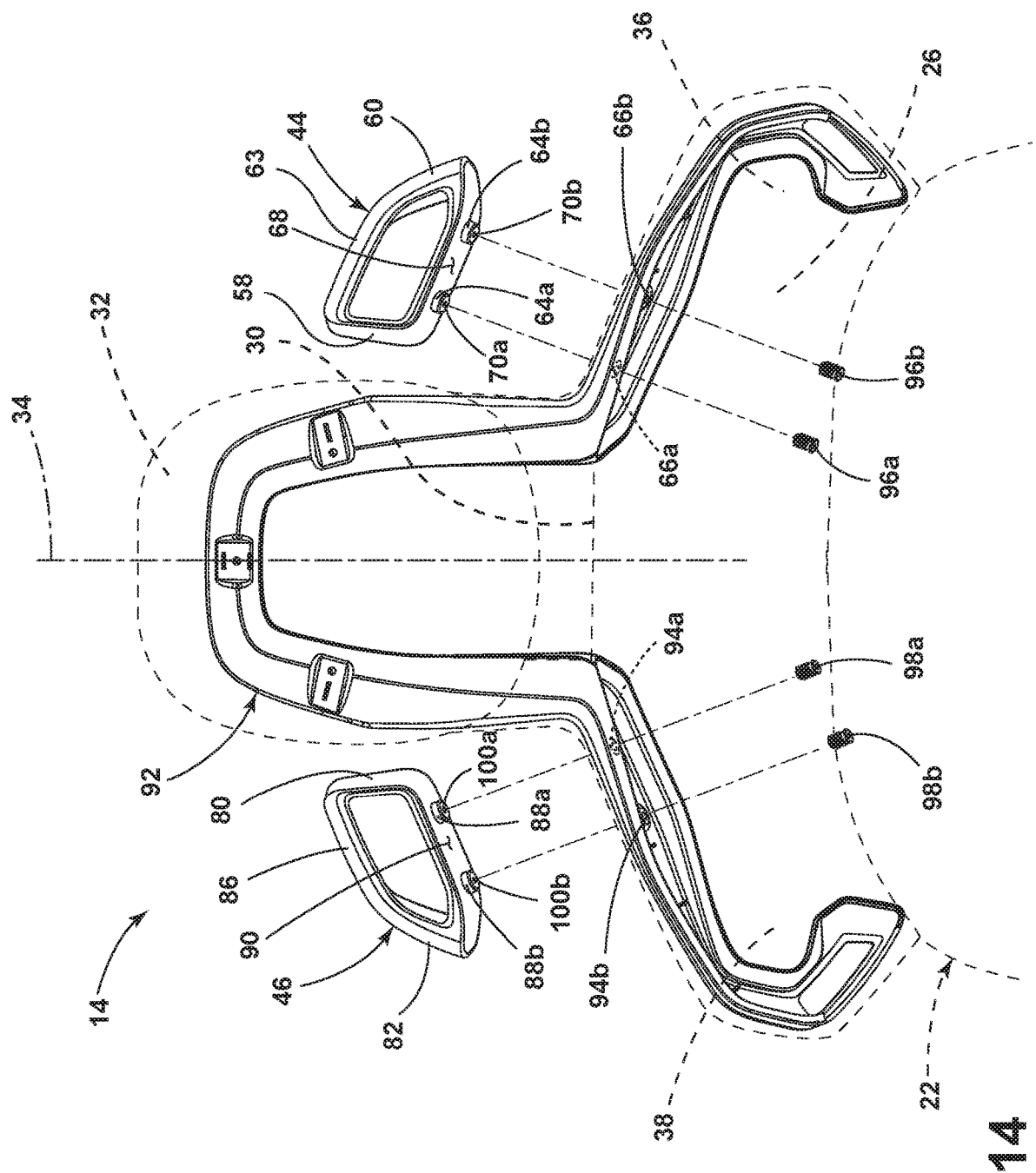
FIG. 14 is a front exploded view of the seatback of FIG. 2, illustrating a fastener extending through the first boss receiver of the headrest support assembly and into the first fastener receiver disposed within the first boss of the first shoulder belt guide to fasten the first shoulder belt guide to the headrest support assembly and thus the seatback.
Figure 15:
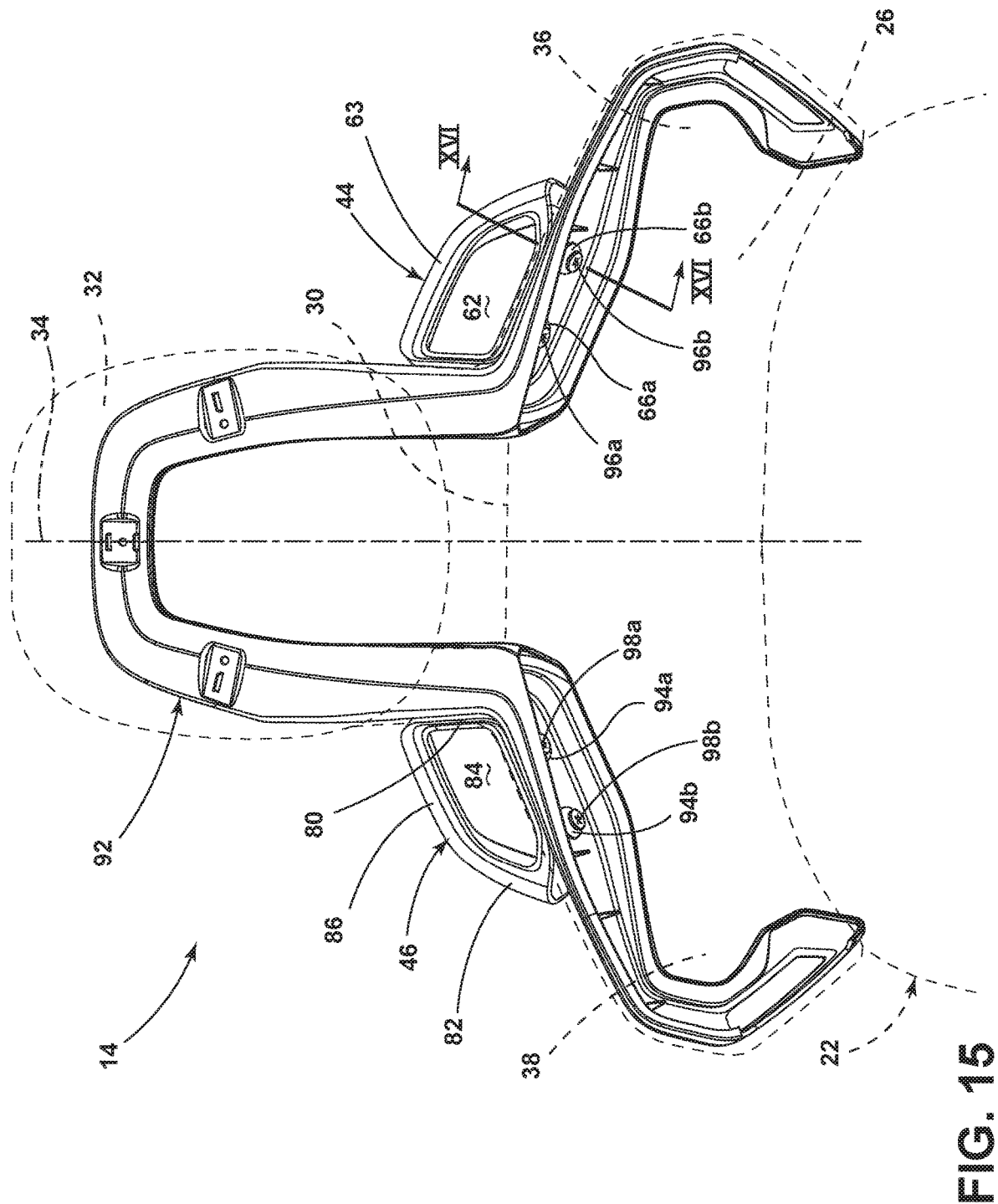
FIG. 15 is a perspective view of the seatback of FIG. 2, illustrating fasteners fastening the first shoulder belt guide and the second shoulder belt guide to the headrest support assembly and thus the seatback.
Figure 16:
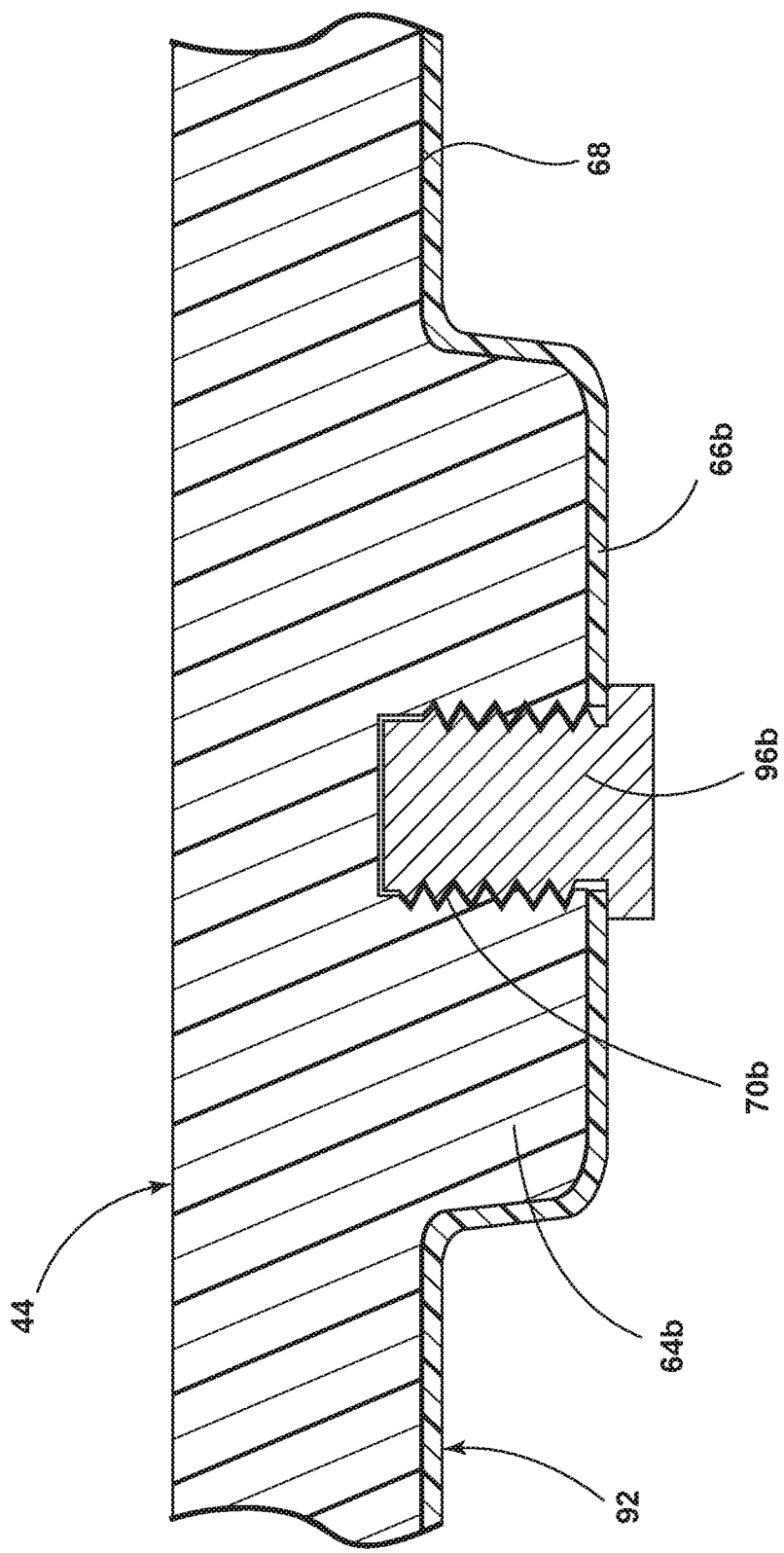
FIG. 16 is a side view of the cross-section of the seatback taken through line XVI-XVI of FIG. 15, illustrating the second boss of the first shoulder belt guide received within the second boss receiver disposed at the first side of the headrest support assembly and a fastener extending through the second boss receiver and into the fastener receiver disposed within the second boss.

Referring now to FIGS. 14-16, when assembled, the first boss 64a and the second boss 64b of the first shoulder belt guide 44 are disposed within the first boss receiver 66a and the second boss receiver 66b respectively of the seatback 22, at the first side 36 relative to the midline 34. Because the first boss 64a and the second boss 64b are outwardly extending, the first boss receiver 66a and the second boss receiver 66b of the seatback 22 can receive the first boss 64a and the second boss 64b, respectively. To assemble, by fastening, the first shoulder belt guide 44 to the seatback 22, a fastener 96a is disposed through the first boss receiver 66a and into the first boss 64a (more particularly, the first fastener receiver 70a within the first boss 6a), while the first boss 64a is disposed in the first boss receiver 66a. Likewise, a fastener 96b is disposed through the second boss receiver 66b and into the second boss 64b (more particularly, the second fastener receiver 70b within the second boss 64b), while the second boss 64b is disposed in the second boss receiver 66b.

If the second shoulder belt guide 46 is utilized, then, when assembled, the first boss 88a and the second boss 88b of the second shoulder belt guide 46 are disposed within the first boss receiver 94a and the second boss receiver 94b, respectively, of the seatback 22, as the second side 38 relative to the midline 34. To assemble, by fastening, the second shoulder belt guide 46 to the seatback 22, a fastener 98a is disposed through the first boss receiver 94a and into the first boss 88a (more particularly, the first fastener receiver 100a within the first boss 88a), while the first boss 88a is disposed in the first boss receiver 94a. Likewise, a fastener 98b is disposed through the second boss receiver 94b and into the second boss 88b (more particularly, the second fastener receiver 100b within the second boss 88b), while the second boss 88b is disposed in the second boss receiver 94b.

The fasteners 96a, 96b, 98a, 98b can be bolts with threads and the first fastener receiver 70a, the second fastener receiver 70b, the first fastener receiver 100a, and the second fastener receiver 100b can be bushings threaded to match threads on the fasteners 96a, 96b, 98a, 98b. Because fasteners 96a, 96b, 98a, 98b are utilized, the first shoulder belt guide 44 and the second shoulder belt guide 46 are removable (that is, can be unfastened) from the seatback 22. Because the first shoulder belt guide 44 and the second shoulder belt guide 46 are thus not integrated into the seatback 22 (as a typical shoulder belt pass-throughs are), the first shoulder belt guide 44 and the second shoulder belt guide 46 are easily removable for replacement and customization as the occupant may desire.

If the headrest support assembly 92 is utilized and the first boss receiver 66a, the second boss receiver 66b, the first boss receiver 94a, and the second boss receiver 94b, are disposed within the headrest support assembly 92, then the first shoulder belt guide 44 and the second shoulder belt guide 46 are fastened to the headrest support assembly 92. In any event, as the seatback contact surface 68 contacts the seatback 22 when the first shoulder belt guide 44 is attached thereto, and the first boss receiver 66a and the second boss receiver 66b receive the first boss 64a and the second boss 64b, respectively, the first boss 64a and the second boss 64b are hidden from view during normal use of the seatback 22. Likewise, as the seatback contact surface 90 contacts the seatback 22 when the second shoulder belt guide 46 is attached thereto, and the first boss receiver 94a and the second boss receiver 94b receive the first boss 88a and the second boss 88b, respectively, the first boss 88a and the second boss 88b are hidden from view during normal use of the seatback 22.

Figure 17:
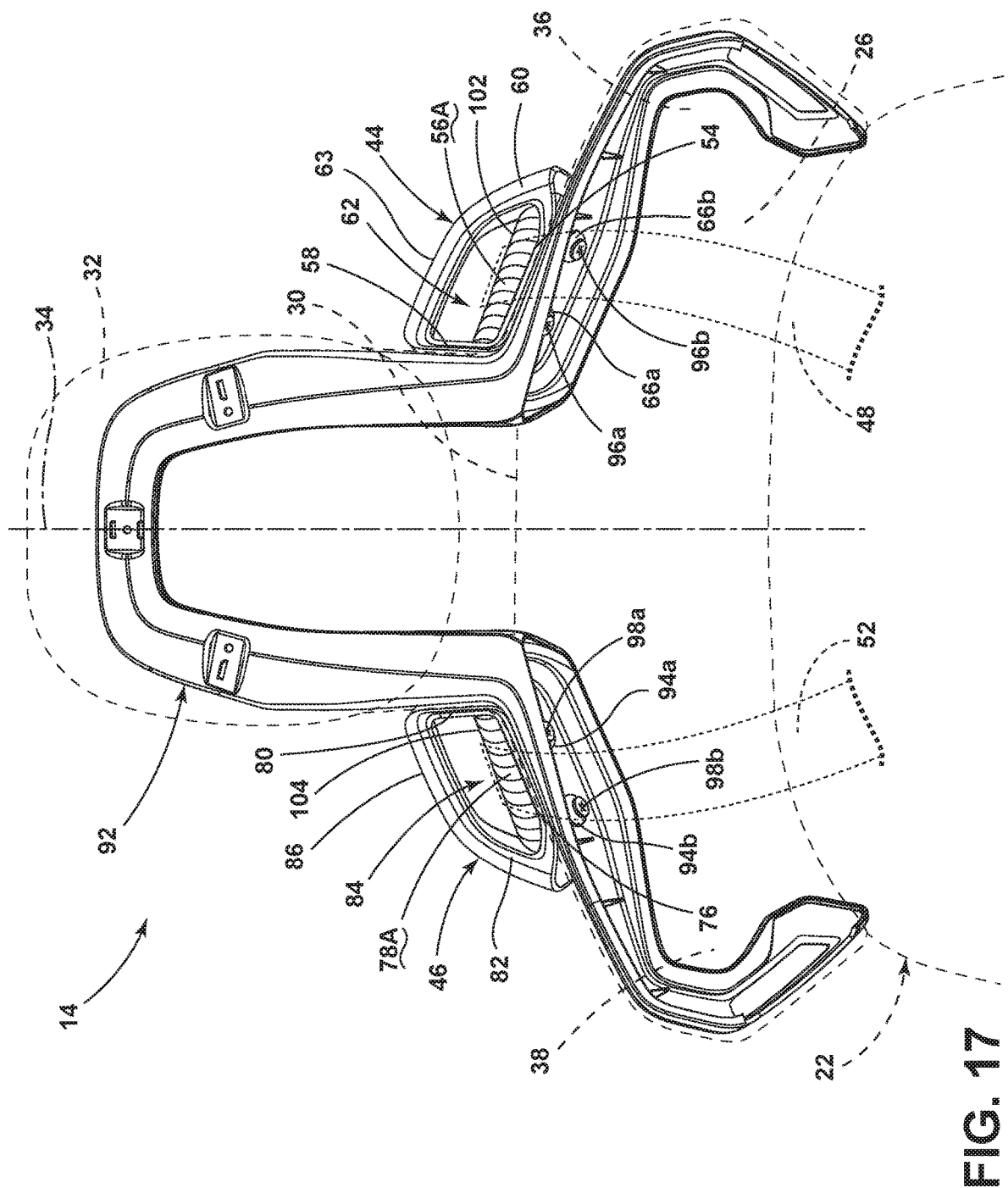
FIG. 17 is a front view of the seatback of FIG. 2, illustrating a first shim attached to the first shoulder belt guide to provide an elevated lateral belt contact surface further above a top section of the seatback than the lateral belt contact surface of the lateral section of the first shoulder belt guide, in order to elevate the first shoulder belt to accommodate a taller occupant.

Referring now to FIG. 17, a first shim 102 can be coupled to the first shoulder belt guide 44 to raise the first shoulder belt 48 in order to accommodate a taller passenger. More specifically, the first shim 102 provides an elevated lateral belt contact surface 56A upon which the first shoulder belt 48 rests, and the elevated lateral belt contact surface 56A is elevated relative to the lateral belt contact surface 56 of the lateral section 54 of the first shoulder belt guide 44. The first shim 102 can be disposed over the lateral section 54 of the first shoulder belt guide 44 with the elevated lateral belt contact surface 56A disposed above the lateral belt contact surface 56 of the lateral section 54. The elevated lateral belt contact surface 56A of the first shim 102 now cooperates with the inner section 58 and the outer section 60 of the first shoulder belt guide 44 to form the channel 62 that retains the first shoulder belt 48. The first shoulder belt 48 is disposed above and in contact with the elevated lateral belt contact surface 56A of the first shim 102, and between the inner section 58 and the outer section 60 of the first shoulder belt guide 44. The first shim 102 can be a piece of metal or plastic adhered to or snap-fit attached to (among other ways of coupling to) the lateral section 54 of the first shoulder belt guide 44 over the lateral belt contact surface 56A. The first shoulder belt guide 44 can be included with a kit that includes the first shim 102 and other first shims 102 of various thicknesses to allow the occupant to select the first shim 102 that provides the elevated lateral belt contact surface 56A of sufficient elevation above the lateral belt contact surface 56 of the first shoulder belt guide 44 and therefore position the first shoulder belt 48 to the most suitable position for the size of the occupant.

Likewise, a second shim 104 can be coupled to the second shoulder belt guide 46 to raise the second shoulder belt 52. The second shim 104 provides an elevated lateral belt contact surface 78A upon which the second shoulder belt 52 rests, and the elevated lateral belt contact surface 78A is elevated relative to the lateral belt contact surface 78 of the lateral section 76 of the second shoulder belt guide 46. The second shim 104 can be disposed over the lateral section 76 of the second shoulder belt guide 46 with the elevated lateral belt contact surface 78A disposed above the lateral belt contact surface 78 of the lateral section 76. The elevated lateral belt contact surface 78A of the second shim 104 now cooperates with the inner section 80 and the outer section 82 of the second shoulder belt guide 46 to form the channel 84 that retains the second shoulder belt 52. The second shoulder belt 52 is disposed above and in contact with the elevated lateral belt contact surface 78A of the second shim 104, and between the inner section 80 and the outer section 82 of the second shoulder belt guide 46. The second shim 104 can be a piece of metal or plastic adhered to or snap-fit attached to (among other ways of coupling to) the lateral section 76 of the second shoulder belt guide 46. The second shoulder belt guide 46 can be included with a kit that includes the second shim 104 and other second shims 104 of various thicknesses to allow the occupant to select the second shim 104 that provides the elevated lateral belt contact surface 78A of sufficient elevation above the lateral belt contact surface 78 of the second shoulder belt guide 46 and therefore position the second shoulder belt 52 to the most suitable position for the size of the occupant.

Without the first shim 102 and the second shim 104, the first shoulder belt guide 44 and the second shoulder belt guide 46 respectively can be configured to position the first shoulder belt 48 and the second shoulder belt 52 respectively to secure a relatively small (i.e., the 5% smallest) occupant to the first seating assembly 14. By attaching a first shim 102 and a second shim 104 of the appropriate size, the first shoulder belt guide 44 and the second shoulder belt guide 46 can be configured to position the first shoulder belt 48 and the second shoulder belt guide 46 respectively to secure larger occupants up to and including the relatively large (i.e., the 5% largest). The pass-throughs integrated into a traditional seatback are not similarly adjustable to position properly shoulder belts to secure the relatively large and the relatively small occupants. Moreover, replacement of such traditional pass-throughs is labor intensive.

Figure 18:
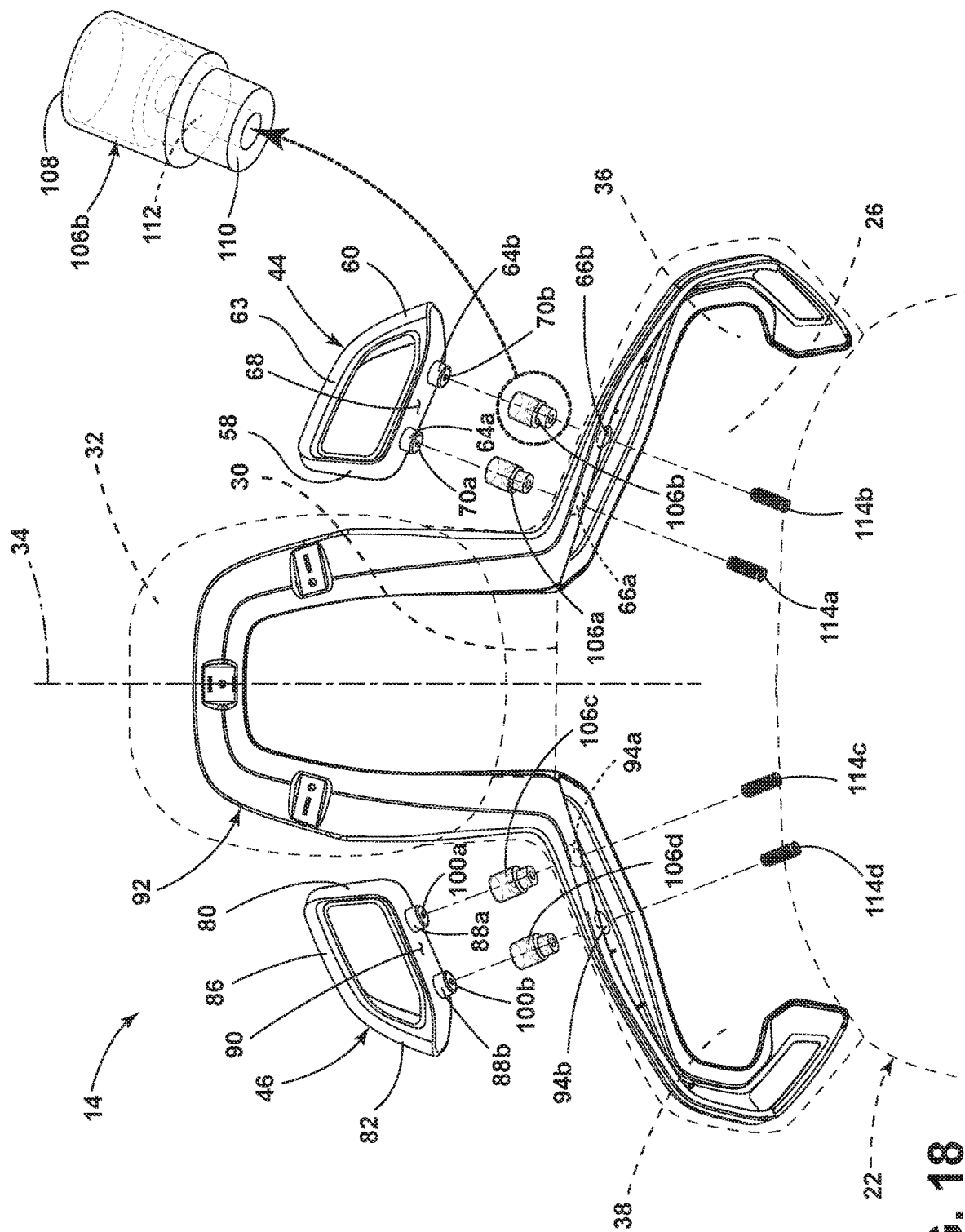
FIG. 18 is a front exploded view of an alternative embodiment of the seatback of FIG. 2, similar to FIG. 14, but illustrating an extender disposed between the first shoulder belt guide and seatback with a fastener extending through the first boss receiver of the headrest support assembly, through a central aperture of the extender, and into the first fastener receiver disposed within the first boss of the first shoulder belt guide to fasten the first shoulder belt guide to the headrest support assembly.
Figure 19:
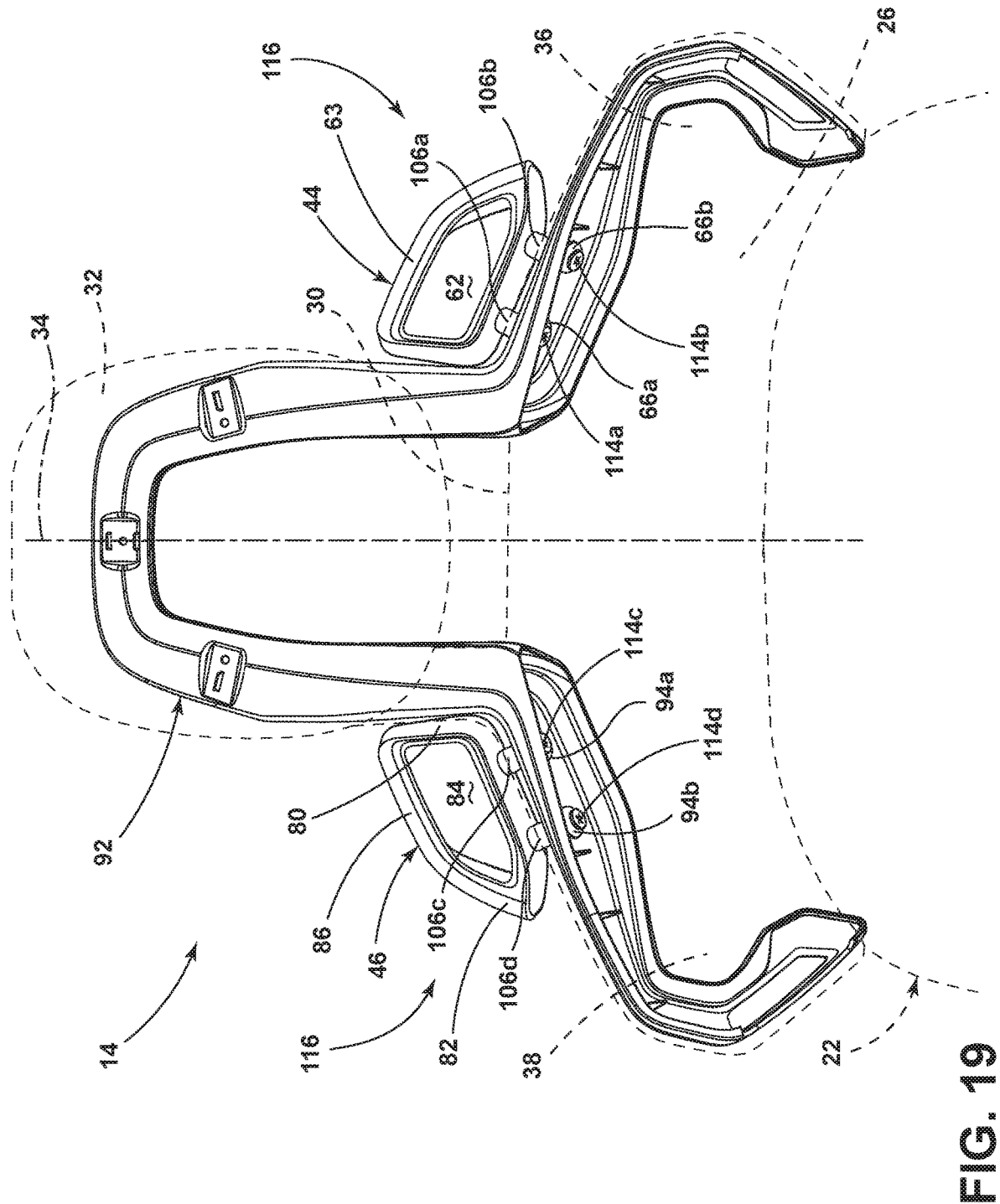
FIG. 19 is a perspective view of the alternative embodiment of FIG. 18, illustrating extenders disposing the first shoulder belt guide and the second shoulder belt guide in a second position compared to the position illustrated in FIG. 15 without the extenders, so as to elevate later belt contact surfaces of the first shoulder belt guide and the second shoulder belt guide to accommodate taller occupants of the first seating assembly

Referring now to FIGS. 18 and 19, instead of using the first shim 102 to provide the elevated lateral belt contact surface 56A over the lateral belt contact surface 56, extenders 106 (such as extenders 106a and 106b) can be disposed between the first shoulder belt guide 44 and the seatback 22 to elevate the lateral belt contact surface 56 directly. For example, extender 106a includes a first end 108 shaped to surround and receive the first boss 64a of the first shoulder belt guide 44. The extender further includes a second end 110 shaped to be received by the first boss receiver 66a of the seatback 22. The extender further includes a central aperture 112 to allow fastener 114a to fasten the first shoulder belt guide 44 to the seatback 22 as described above but additionally with the extender 106a between the first shoulder belt guide 44 and the seatback 22. Extender 106b is disposed between the second boss 64b and second boss receiver 66b of the seatback 22 in a like manner using fastener 114b. Likewise, instead of using the second shim 104 on the second shoulder belt guide 46 to provide the elevated lateral belt contact surface 78A over the lateral belt contact surface 78, extender 106c can be disposed between the first boss 88a of the second shoulder belt guide 46 and the first boss receiver 94a, and extender 106d can be disposed between the first boss 88b and the second boss receiver 94b in a like manner, using fasteners 114c and 114d. So implementing the extenders 106c and 106d between the second shoulder belt guide 46 and the seatback 22 elevates the lateral belt contact surface 78 directly. The extenders 106 and fasteners 114 can be offered and sold as a kit to allow for the customization of the elevation of the lateral belt contact surfaces 56, 78. The extenders 106 can be offered and sold as sets of extenders 106 of varying lengths (such as 2 inches and 3 inches). Thus, an occupant of a certain height might purchase the kit including a set of four extenders 106 of 2 inches in length and fasteners 114 of appropriate length, while an occupant of a greater height might purchase the kit including a set of four extenders 106 of three inches in length and fasteners 114 of an appropriate length. The extenders 106 move the lateral belt contact surfaces 56, 78 to further away from the top portion 30 of the seatback 22 and/or from the seat 20 to accommodate taller occupants of the first seating assembly 14. Thus, with the extenders 114, the first shoulder belt guide 44 and the second shoulder belt guide 46 are in a second position 116 compared to a first position (see FIG. 15) without the extenders 114.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly of a vehicle comprising:
   a seatback comprising a top portion and a headrest extending above the top portion, the seatback comprising:
      a first boss receiver; and
      a second boss receiver; and
   a first shoulder belt guide fastened to the seatback adjacent the top portion and configured to retain a first shoulder belt of an occupant restraint assembly;
   the first shoulder belt guide comprising:
      a lateral section that includes a lateral belt contact surface configured to contact the first shoulder belt, and a seatback contact surface that contacts the seatback and is disposed on the opposite side of the lateral section as the lateral belt contact surface;
      an inner section upwardly extending from the lateral belt contact surface;
      an outer section upwardly extending from the lateral belt contact surface opposite of the inner section;
      a channel configured to retain the first shoulder belt, the channel formed by the lateral belt contact surface, the inner section, and the outer section; and
      a first boss and a second boss extending from the seatback contact surface, the first boss disposed within the first boss receiver of the seatback, and the second boss disposed within the second boss receiver of the seatback.

2. The seating assembly of claim 1,
the first boss and the second boss include snap-fit elements received by the seatback.

3. The seating assembly of claim 1 further comprising:
a first fastener disposed through the first boss receiver and into the first boss of the first shoulder belt guide to fasten the first shoulder belt guide to the seatback; and
a second fastener disposed through the second boss receiver and into the second boss of the first shoulder belt guide to fasten the first shoulder belt guide to the seatback.

4. The seating assembly of claim 1 further comprising:
a midline;
a first side of the midline, wherein the first shoulder belt guide, the first boss receiver, and the second boss receiver are disposed to the first side of the midline;
a second side of the midline;
another pair of boss receivers disposed to the second side of the midline; and
a second shoulder belt guide fastened to the seatback adjacent the top portion to the second side of the midline, and configured to retain a second shoulder belt of the occupant restraint assembly;
the second shoulder belt guide comprising:
   a lateral section that includes a lateral belt contact surface configured to contact the first shoulder belt, and a seatback contact surface that contacts the seatback and is disposed on the opposite side of the lateral section as the lateral belt contact surface;
   an inner section upwardly extending from the lateral belt contact surface;
   an outer section upwardly extending from the lateral belt contact surface opposite of the inner section;
   a channel configured to retain the second shoulder belt, the channel formed by the lateral belt contact surface, the inner section, and the outer section; and
   a first boss and a second boss extending from the seatback contact surface and disposed within the another pair of boss receivers that are disposed to the second side of the midline.

5. The seating assembly of claim 1,
the first shoulder belt guide further comprising a top section generally extending laterally between the inner section and the outer section and cooperating with the lateral belt contact surface, the inner section, and the outer section to bound the channel contiguously.

6. The seating assembly of claim 5
the first shoulder belt guide further comprising a lateral section that provides the lateral belt contact surface;
the top section is approximately parallel to and shorter than the lateral section; and
the outer section extends from the lateral section at an acute angle.

7. The seating assembly of claim 1 further comprising:
a headrest support assembly attached to the seatback that extends the headrest above the top portion of the seatback;
wherein, the first shoulder belt guide is fastened to the headrest support assembly.

8. The seating assembly of claim 3,
the first shoulder belt guide further comprising a first fastener receiver disposed within the first boss and a second fastener receiver disposed within the second boss;
the first fastener is disposed through the first boss receiver and into the first fastener receiver within the first boss; and
the second fastener is disposed through the second boss receiver and into the second fastener receiver within the second boss.

9. The seating assembly of claim 7,
the first boss receiver and the second boss receiver are disposed within the headrest support assembly.

10. The seating assembly of claim 1 further comprising:
a first shim coupled to the first shoulder belt guide, the first shim including an elevated lateral belt contact surface disposed above the lateral belt contact surface of the first shoulder belt guide;
wherein, the elevated lateral belt contact surface of the first shim, and the inner section and the outer section of the first shoulder belt guide, at least in part form the channel configured to retain the first shoulder belt with the first shoulder belt disposed above and in contact with the elevated lateral belt contact surface of the first shim, and disposed between the inner section and the outer section of the first shoulder belt guide.

11. A shoulder belt guide to retain a shoulder belt of an occupant restraint assembly above a top portion of a seatback comprising:
a lateral section that comprises:
(a) a lateral belt contact surface configured to contact a shoulder belt of an occupant restraint assembly; and
(b) a seatback contact surface that is disposed on the opposite side of the lateral section as the lateral belt contact surface and is configured to contact the seatback when the shoulder belt guide is fastened to the seatback;
an inner section upwardly extending from the lateral belt contact surface;
an outer section upwardly extending from the lateral belt contact surface opposite of the inner section;
a channel configured to retain the shoulder belt, the channel formed by the lateral belt contact surface, the inner section, and the outer section; and
a first boss and a second boss extending from the seatback contact surface, the first boss and the second boss configured to assist in fastening the shoulder belt guide to the seatback at a predetermined location on the seatback.

12. The shoulder belt guide of claim 11 further comprising:
a first fastener receiver configured to receive a fastener to fasten the shoulder belt guide to the seatback.

13. The shoulder belt guide of claim 12 further comprising:
a second fastener receiver configured to receive a fastener to fasten the shoulder belt guide to the seatback.

14. The shoulder belt guide of claim 13,
wherein, the first boss includes the first fastener receiver; and
wherein, the second boss includes the second fastener receiver.

15. The shoulder belt guide of claim 11 further comprising:
a top section generally extending laterally between the inner section and the outer section and cooperating with the lateral belt contact surface, the inner section, and the outer section to bound the channel contiguously.

16. The shoulder belt guide of claim 11 further comprising:
a top section extending generally laterally from the inner section and the outer section;
wherein, the top section, the lateral section, the inner section, and the outer section combine to bound contiguously the channel.

17. The shoulder belt guide of claim 16,
wherein, the outer section extends from the lateral section at an acute angle.

18. The shoulder belt guide of claim 17 further comprising:
a first bushing countersunk into the first boss, the first bushing configured to receive a fastener to fasten the shoulder belt guide to the seatback; and
a second bushing countersunk into the second boss, the second bushing configured to receive a fastener to fasten the shoulder belt guide to the seatback.

19. A seatback comprising:
a boss receiver; and
a shoulder belt guide including a boss and a lateral belt contact surface, the shoulder belt guide configured to accept and retain a shoulder belt of an occupant restraint assembly above the lateral belt contact surface;
wherein, in a first position of the shoulder belt guide, the boss is disposed within the boss receiver and a fastener is disposed through the boss receiver and into the boss to fasten the shoulder belt guide to the seatback;
wherein, in a second position of the shoulder belt guide, an extender including a first end, a second end, and a central aperture is disposed between the shoulder belt guide and the boss receiver, with the first end of the extender surrounding and receiving the boss of the shoulder belt guide, the boss receiver receiving the second end of the extender, and a fastener is disposed through the boss receiver, through the central aperture of the extender, and into the boss to fasten the shoulder belt guide to the seatback; and
wherein, in the second position, the lateral belt contact surface is at a higher elevation than in the first position.

20. The seatback of claim 19,
the shoulder belt guide comprising:
a lateral section that comprises:
(a) the lateral belt contact surface; and
(b) a seatback contact surface, from which the boss extends, that contacts the seatback when the shoulder belt guide is in the first position and is disposed on the opposite side of the lateral section as the lateral belt contact surface;
an inner section upwardly extending from the lateral belt contact surface;
an outer section upwardly extending from the lateral belt contact surface opposite of the inner section; and
a channel configured to retain the shoulder belt, the channel formed by the lateral belt contact surface, the inner section, and the outer section.

* * * * *